US011576045B2

(12) United States Patent
Michaelis et al.

(10) Patent No.: US 11,576,045 B2
(45) Date of Patent: Feb. 7, 2023

(54) USER ACCESS-RESTRICTIVE SYSTEMS AND METHODS FOR OPERATING PARTICLE SAMPLING DEVICES

(71) Applicant: Particle Measuring Systems, Inc., Boulder, CO (US)

(72) Inventors: Matt Michaelis, Boulder, CO (US); Daniele Pandolfi, Boulder, CO (US); Brett Haley, Boulder, CO (US)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 157 days.

(21) Appl. No.: 16/987,682

(22) Filed: Aug. 7, 2020

(65) Prior Publication Data

US 2021/0044978 A1 Feb. 11, 2021

Related U.S. Application Data

(60) Provisional application No. 62/975,533, filed on Feb. 12, 2020, provisional application No. 62/884,846, filed on Aug. 9, 2019.

(51) Int. Cl.
*H04W 12/08* (2021.01)
*H04W 12/06* (2021.01)
(Continued)

(52) U.S. Cl.
CPC ......... *H04W 12/08* (2013.01); *H04W 12/033* (2021.01); *H04W 12/06* (2013.01); *H04W 12/47* (2021.01); *H04W 12/63* (2021.01)

(58) Field of Classification Search
CPC ..... H04W 12/47; H04W 12/06; H04W 12/63; H04W 12/08; H04W 12/033; Y02D 30/70
See application file for complete search history.

(56) References Cited

U.S. PATENT DOCUMENTS 7,663,502 B2 2/2010 Breed et al.
7,745,469 B2 6/2010 Dahmen et al.
(Continued)

FOREIGN PATENT DOCUMENTS

CN 1592191 A 3/2005
CN 101573704 A 11/2009
(Continued)

OTHER PUBLICATIONS

International Search Report and Written Opinion dated Oct. 6, 2020 in PCT/US20/45342, 11 pages.
(Continued)

*Primary Examiner* — Mohammad A Siddiqi
(74) *Attorney, Agent, or Firm* — Leydig, Voit & Mayer, Ltd.

(57) ABSTRACT

Systems, methods, devices and software for operating particle sampling devices in a user-restrictive manner include a tag and a particle sampling device. The device includes a tag reader and a processor in communication with the tag reader. The processor: receives device configuration data and reads operational and/or user data from the tag having that data encoded thereon. Based on the data read from the tag, the processor may either grant or deny access to a user for performing device operations. Alternatively, for a headless particle sampling device configured for minimal user interaction during operation, the device is removably attached to a supporting structure proximate the tag positioned in or on the supporting structure. In the headless configuration, the processor reads device configuration parameters including network communication information from the tag following device power up. Embodiments of the disclosure facilitate various efficiency improvements for manufacturing operations reliant on particle sampling devices.

9 Claims, 12 Drawing Sheets

(51) Int. Cl.
*H04W 12/00* (2021.01)
*H04W 12/033* (2021.01)
*H04W 12/47* (2021.01)
*H04W 12/63* (2021.01)

(56) References Cited

U.S. PATENT DOCUMENTS

| | | |
|---|---|---|
| 7,916,293 B2 | 3/2011 | Mitchell et al. |
| 8,154,724 B2 | 4/2012 | Mitchell et al. |
| 9,410,948 B2 * | 8/2016 | Dittmer ............ G01N 33/54326 |
| 9,753,046 B2 | 9/2017 | Burri et al. |
| 9,865,016 B2 | 1/2018 | Joshi et al. |
| 10,371,620 B2 | 8/2019 | Knollenberg et al. |
| 10,374,873 B2 | 8/2019 | Toepke et al. |
| 10,488,305 B2 | 11/2019 | Miller-Lionberg et al. |
| 10,533,965 B2 | 1/2020 | Wang et al. |
| 10,859,487 B2 | 12/2020 | Knollenberg et al. |
| 10,997,845 B2 | 5/2021 | MacLaughlin et al. |
| 11,004,557 B2 * | 5/2021 | Canady ................. G16H 20/40 |
| 2003/0229411 A1 * | 12/2003 | Shen ...................... G06Q 99/00 |
| | | 700/121 |
| 2014/0046722 A1 * | 2/2014 | Rosenbloom .......... G06Q 10/06 |
| | | 702/19 |
| 2016/0078395 A1 * | 3/2016 | Schoening ........... G06Q 10/087 |
| | | 705/7.15 |
| 2018/0026795 A1 * | 1/2018 | Klammer ................ G06F 21/82 |
| | | 713/176 |
| 2019/0110436 A1 | 4/2019 | Gardner et al. |
| 2019/0250785 A1 | 8/2019 | Pandolfi et al. |
| 2020/0150017 A1 | 5/2020 | Bates et al. |
| 2021/0295670 A1 | 9/2021 | MacLaughlin et al. |

FOREIGN PATENT DOCUMENTS

| | | |
|---|---|---|
| CN | 105164736 A | 12/2015 |
| CN | 107643738 A | 1/2018 |

OTHER PUBLICATIONS

"Quartz Gatekeeper Features" Quartz Imaging Corporation, 2018.
"Quartz Gatekeeper Instrument Access Control & Scheduling" Quartz Imaging Corporation, 2019.
Chinese Office Action dated Mar. 18, 2022 in CN 202080045741.5.

* cited by examiner

USER ACCESS-RESTRICTIVE SYSTEMS AND METHODS FOR OPERATING PARTICLE SAMPLING DEVICES

CROSS-REFERENCE TO RELATED APPLICATIONS

This application claims the benefit of and priority to U.S. Provisional Patent Application No. 62/884,846 filed Aug. 9, 2019, and U.S. Provisional Patent Application No. 62/975,533 filed Feb. 12, 2020, each of which is hereby incorporated by reference in its entirety.

BACKGROUND OF INVENTION

Particle sampling and analysis devices are used prevalently in a number of industries including pharmaceuticals and electronics manufacturing. The instruments provide users information regarding particulate loads in the air of enclosed manufacturing facility spaces. In some cases, such data is used to monitor spaces for particles and characterize the nature of particles that are present. In other cases, sampling, monitoring, and characterizing particles is a requirement imposed by laws and regulations governing the manufacturing operations. For instance, certain pharmaceutical manufacturing operations are required to ensure that air in certain facility environments contains less than a threshold measure of particulate matter to ensure regulatory compliance and the ability to market drug products manufactured in the facility. Similarly, for manufacturing of semiconductor devices for electronics manufacturing, maintaining facility spaces beneath a threshold airborne particle count is required to ensure product quality, as undesired contamination may result in significant waste and rework.

Conventional particle sampling devices deployed in manufacturing environments may be used by a large number of operators during continual operations. In at least some known devices, systems and methods, configuring particle sampling devices for multi-user deployment is a laborious and time-consuming process which diverts resources away from more value-added activities. In some cases, a number of staff may be dedicated solely to configuring these devices for the operators using them in manufacturing facilities. As a new user needs to be added for using a particle sampling device, both scarce instrument memory resources and expensive information technology personnel time need to be taken.

Automation and other technological innovations in industries utilizing particle sampling and analysis devices have provided efficiency gains and quality improvements to enable reliable product supply to ever growing markets. Configuration and administration modes, and related operational aspects, of particle sampling instruments present opportunities to further improve manufacturing operations dependent on these devices.

SUMMARY OF THE INVENTION

The disclosed embodiments, described herein as non-limiting examples, further provide a number of advantageous technical benefits as compared to known particle sampling devices, and systems and methods for operating the same. To meet operational requirements including compliance with standard operating procedures and/or regulatory requirements (e.g., United States Code of Federal Regulations, 21 C.F.R. Part 11 for FDA-regulated operations), the disclosed devices, systems, methods and software facilitate securing particle sampling devices against improper/unauthorized use, retaining user identification (ID) information with sampling data and an audit trail for device operations, and enabling an unlimited number of users or operators to be added for any single device, thereby negating limitations due to scarce instrument memory resources.

Rather than having to configure particle sampling devices one at a time for use with individual users, and instead of requiring users to manually login to the device, the disclosed embodiments enable an unlimited number of users to be added, deleted, and otherwise modified at one time. A simple and straightforward scheme is provided which may be employed by staff without a great deal of training or expertise. While achieving these technical benefits does require some additional device hardware, the disclosed embodiments reduce the probability of human errors being introduced in device configuration processes and sample data collection and analysis, and enhances cybersecurity of the devices and associated communications and computing systems. Furthermore, users of particle sampling devices incorporating the features disclosed herein need to touch the device less as compared to conventional instruments, which thereby improves the ergonomics of particle sampling operations and potentially decreases the probability of facility contamination and device cleaning frequency and intensity.

Moreover, users practicing the disclosed devices, systems, methods and software may accomplish a full operational sequence for particle sampling in facilities in a substantially shorter amount of time as compared to conventional techniques. Through computationally-, memory-, and power-efficient user friendly integration of the features of the disclosed embodiments with sampling operations and sample data storage, downstream data processing and report generation is facilitated, thereby increasing the efficiency of these tasks. These, and other technical and practical advantages appreciable to persons of ordinary skill in the art, further facilitate users of the disclosed devices, systems, methods, and software accomplishing necessary particle sampling and analysis tasks in a safer and more efficient manner that is less prone to costly errors being made.

A first aspect of the disclosure provides a method of operating a particle sampling system. The method includes receiving device operation configuration data, the configuration data including a device password; reading user data from a tag positioned proximal a particle sampling device of the system, where the tag includes the user data encoded thereon, the user data including a device user name and the device password; and in response to the device password read from the tag matching the device password of the received configuration data, granting access to a device user for performing device operations, or in response to the device password read from the tag not matching the device password of the received configuration data, denying the device user access to the device.

In one embodiment of method of the first aspect, the particle sampling system includes a plurality of particle sampling devices; and receiving the configuration data includes receiving the configuration data by at least two of the plurality of devices.

In any of the above embodiments of the method of the first aspect, the method further includes cloning the configuration data from a first device of the plurality of devices to at least a second device of the plurality of devices.

In any of the above embodiments of the method of the first aspect, the user data encoded on the tag further includes a tag ID number; and receiving the configuration data includes receiving at least one tag number associated with at least one tag authorized for use with the device by the device user.

In any of the above embodiments of the method of the first aspect, reading the user data from the tag includes reading the tag ID number from the tag; and in response to the device password and the tag ID number read from the tag matching the device password and a tag ID number of the received configuration data, granting the access to the device user, or in response to the device password or the tag ID number read from the tag not matching the device password or the tag ID of the received configuration data, denying the device user access to the device.

In any of the above embodiments of the method of the first aspect, the tag is an NFC tag for wirelessly communicating with the device using a near field communication protocol.

In any of the above embodiments of the method of the first aspect, the NFC tag is a passive NFC tag.

In any of the above embodiments of the method of the first aspect, the NFC tag is an active NFC tag.

In any of the above embodiments of the method of the first aspect, reading the user data from the tag includes: transmitting an interrogation signal to the NFC tag; and receiving the user data from the NFC tag in response to transmitting the interrogation signal.

In any of the above embodiments of the method of the first aspect, the configuration data further includes a device access level; and the method further includes, in response to the device password read from the tag matching the device password of the received configuration data, determining the device access level associated with the device user name read from the tag.

In any of the above embodiments of the method of the first aspect, reading the user data from the tag includes reading the user data from a first tag positioned proximal the device, and the method further includes: reading a device recipe from a second tag positioned proximal the device; and loading the device recipe for performing the device operations.

In any of the above embodiments of the method of the first aspect, the method further includes sampling an exterior environment of the device according to the device recipe read from the second tag.

In any of the above embodiments of the method of the first aspect, the method further includes storing data collected for the sampling in association with the device user name read from the first tag.

In any of the above embodiments of the method of the first aspect, the method further includes storing an audit trail for the performed device operations including the device user name read from the first tag associated with one or more of the performed device operations.

In any of the above embodiments of the method of the first aspect, the method further includes encoding the user data on the tag.

In any of the above embodiments of the method of the first aspect, encoding the user data on the tag includes encrypting at least some of the user data on the tag.

In any of the above embodiments of the method of the first aspect, reading the user data from the tag includes decrypting the at least some of the user data encoded on the tag.

In any of the above embodiments of the method of the first aspect, the method further includes encoding data for the device recipe on the second tag.

In any of the above embodiments of the method of the first aspect, encoding data for the device recipe on the second tag includes encrypting at least some of the data for the device recipe on the second tag.

In any of the above embodiments of the method of the first aspect, reading the device recipe from the second tag includes decrypting the at least some of the data for the device recipe encoded on the second tag.

In any of the above embodiments of the method of the first aspect, the first tag includes a plurality of first tags; and encoding the user data on the first tag includes encoding the same device password on each first tag of the plurality of first tags.

In any of the above embodiments of the method of the first aspect, the user data further includes a tag ID number.

In any of the above embodiments of the method of the first aspect, encoding the user data on the first tag includes encoding a unique tag ID number on the each first tag.

In any of the above embodiments of the method of the first aspect, the user data includes a plurality of device user names for a plurality of device users; and encoding the user data on the tag includes encoding a unique device user name to the each first tag.

In any of the above embodiments of the method of the first aspect, the user data includes a plurality of device access levels; each of the plurality of device access levels is associated with a respective one or more of the plurality of device user names; and encoding the user data on the first tag further includes: encoding one device access level for one of the plurality of device user names on the each first tag, or encoding two or more device access levels for the one device user name on the each first tag.

In any of the above embodiments of the method of the first aspect, the method may further comprise providing a first audio sound during reading, encoding and/or writing the tag to indicate to the user that the reading, encoding and/or writing process is active. In any of the above embodiments of the method of the first aspect, the method may further comprise providing a second sound for indicating that the reading, encoding and/or writing process for the tag is complete (e.g., the sound may be a warbling, or a clicking noise (indicative of data transfer) of the like followed by a distinctive beep to indicate the process is complete). In any of the above embodiments of the method of the first aspect, the method may further comprise providing an on-screen indication (e.g., via a pop-up dialog) for indicating that the reading, encoding and/or writing process is complete.

A second aspect of the disclosure provides a particle sampling device. The particle sampling device includes a device housing including a sampling port; a sampler for sampling particles of an exterior environment of the device, where the sampler is positioned in the housing and in flow communication with the sampling port; a tag reader positioned on or in the housing, and including a tag reader transceiver; and a processor in communication with the tag reader, where the processor is configured to: receive device operation configuration data, the configuration data including a device password; read, using the tag reader, user data from a tag positioned proximal the device, where the tag includes the user data encoded thereon, the user data including a device user name and the device password; and in response to the device password read from the tag matching the device password of the received configuration data, grant access to the device to a device user for performing device operations, or in response to the device password read from the tag not matching the device password of the received configuration data, deny the device user access to the device.

In one embodiment of the device of the second aspect, the device further includes a data transfer interface in communication with the processor, where, to receive the device configuration data, the processor is further configured to receive the configuration data via the data transfer interface.

In any of the above embodiments of the device of the second aspect, the device further includes a memory device in communication with the processor, where the processor is further configured to store the received configuration data in the memory device.

In any of the above embodiments of the device of the second aspect, the device is one of a plurality of particle sampling devices; and to receive the configuration data, the processor is further configured to receive the configuration data for at least two of the plurality of devices.

In any of the above embodiments of the device of the second aspect, the device further includes a memory device in communication with the processor, where the processor is further configured to store the received configuration data for the at least two devices in the memory device.

In any of the above embodiments of the device of the second aspect, the device further includes a display in communication with the processor, where: the processor is further configured to display a graphical user interface (GUI) on the display; and to receive the configuration data, the processor is further configured to receive at least some of the configuration data via the GUI.

In any of the above embodiments of the device of the second aspect, at least some of the user data encoded on the tag is encrypted; and to read the user data from the tag, the processor is further configured to decrypt the at least some of the user data encoded on the tag.

In any of the above embodiments of the device of the second aspect, the tag is an NFC tag for wirelessly communicating with the tag reader of the device.

In any of the above embodiments of the device of the second aspect, to read the user data from the tag, the processor is further configured to: transmit, using the tag reader, an interrogation signal to the NFC tag; and receive, using the tag reader, the user data from the NFC tag in response to transmitting the interrogation signal.

In any of the above embodiments of the device of the second aspect, the configuration data further includes a device access level; and in response to the device password read from the tag matching the device password of the received configuration data, the processor is further configured to determine the device access level associated with the device user name read from the tag.

In any of the above embodiments of the device of the second aspect, to read the user data from the tag, the processor is configured to read the user data from a first tag positioned proximal the device, where the processor is further configured to: read a device recipe from a second tag positioned proximal the device; and load the device recipe for performing the device operations.

In any of the above embodiments of the device of the second aspect, the device recipe includes one or more of a sampling time, volume of air to be sampled, a flow rate, a number of samples to be taken, alarm limits, sampling location and any combination of these.

In any of the above embodiments of the device of the second aspect, the device recipe includes: multi-tiered location information including: an area, a room, and at least one location within the room; and one or more of: a sampling type, and a room certification type.

In any of the above embodiments of the device of the second aspect, the sampler is or includes an optical particle counter.

In any of the above embodiments of the device of the second aspect, the sampler is or includes an impactor.

In any of the above embodiments of the device of the second aspect, the sampler is or includes an impinger.

In any of the above embodiments of the device of the second aspect, the device is a portable particle sampling device including a power supply positioned in or on the device housing. A third aspect of the disclosure provides a system for operating a particle sampling device. The system includes: a tag, and the particle sampling device, where the particle sampling device includes: a device housing including a sampling port; a sampler for sampling particles of an exterior environment of the device, where the sampler is positioned in the housing and in flow communication with the sampling port; a tag reader positioned on or in the housing, and including a tag reader transceiver; and a processor in communication with the tag reader, where the processor is configured to: receive device operation configuration data, the configuration data including a device password; read, using the tag reader, user data from a tag positioned proximal the device, where the tag includes the user data encoded thereon, the user data including a device user name and the device password; and in response to the device password read from the tag matching the device password of the received configuration data, grant access to the device to a device user for performing device operations, or in response to the device password read from the tag not matching the device password of the received configuration data, deny the device user access to the device.

In one embodiment of the system of the third aspect, the system further includes a supporting structure positioned in a facility, where the tag and the device are detachably mounted to the supporting structure.

In any of the above embodiments of the system of the third aspect, the supporting structure is or includes a wall plate coupled to a wall of the facility.

In any of the above embodiments of the system of the third aspect, the tag is positioned in or on the wall plate.

In any of the above embodiments of the system of the third aspect, the device further includes a means for receiving electric power from a facility power supply.

In any of the above embodiments of the system of the third aspect, the supporting structure includes a means for supplying electric power to the device.

In any of the above embodiments of the device of the second and third aspects, the device may be configured to provide a first audio sound during reading, encoding and/or writing the tag to indicate to the user that the reading, encoding and/or writing process is active. In any of the above embodiments of the device of the second and third aspects, the device may be configured to provide a second sound for indicating that the reading, encoding and/or writing process for the tag is complete (e.g., The sound may be a warbling, or a clicking noise (indicative of data transfer) or the like followed by a distinctive beep to indicate the process is complete). In any of the above embodiments of the device of the second and third aspects, the device may be configured to provide an on-screen indication (e.g., via a pop-up dialog) for indicating that the reading, encoding and/or writing process is complete.

A fourth aspect of the disclosure provides a system for particle sampling in a facility. In an embodiment, a system for particle sampling in a facility, comprises: A) a particle sampling device comprising: (i) a device housing including a sampling port; (ii) a sampler for sampling particles of an exterior environment of the device, wherein the sampler is positioned in the housing and in flow communication with the sampling port; (iii) a tag reader positioned on or in the housing, and including a tag reader transceiver; and (iv) a processor in communication with the tag reader; B) a supporting structure for coupling to a wall of the facility to facilitate removably positioning the device thereon; and C) a tag for coupling to the supporting structure, wherein: (1) when the tag is coupled to, and device is positioned on, the supporting structure, respectively, the tag and the device are so positioned in respective positions sufficient to permit wireless communication between the tag and the tag reader transceiver; (2) the tag includes device configuration parameters encoded as data thereon; and (3) in response to the device being powered on, the processor is configured to: (a) initiate the wireless communication between the tag and the tag reader transceiver; (b) read, using the tag reader, the device configuration parameters from the tag; and (c) cause the device to perform particle sampling of the exterior environment without involvement of a device user. In an embodiment, for example, the supporting structure is or includes a wall plate coupled to the wall of the facility. In an embodiment, for example, the configuration parameters include network communication information, such as at least one of: Transmission Control Protocol (TCP) information, Internet Protocol (IP) information. In an embodiment, for example, the configuration parameters further comprise user specific configuration data. In an embodiment, for example, the configuration parameters include one or more of a sampling time, a device recipe a location name for instrument, a sample queue size (e.g., for Ethernet data buffering), one or more Wi-Fi communication parameters, a flow cap-off retry count and time, a digital output signal configuration or any combination of these.

In an embodiment, for example, the configuration parameters include one or more input parameters (e.g., such as 4-20 mA input parameters). In an embodiment, for example, the one or more input parameters include one or more channel name, a scale, an offset or any combination of these. In an embodiment, for example, the configuration parameters include one or more output parameters (e.g., output parameters for particle data output). In an embodiment, for example, the one or more output parameters include one or more scaling factor (e.g., number of particles represented by 20 mA).

In an embodiment, for example, the configuration parameters include one or more sampling parameters for stand-alone use (e.g., for situations with no Ethernet control). In an embodiment, for example, the one or more sampling parameters for stand-alone use include one or more of a sample delay, a sample tare time, a sample interval, a sample repeat count, an "Auto-Start" mode or any combination of these. System and methods having stand-alone use capability may, for example, include the step of configuring an "Auto-Start" parameter and/or mode of operation.

In an embodiment, for example, the configuration parameters include one or more parameters for generating or processing an output signal of the device such as one or more parameters for generating or processing an analog output signal including a scaling parameter, offset parameter, threshold parameter, filtering parameter or any combination of these. In an embodiment, for example, the configuration parameters include an action limit, an alert limit or any combination of theses. In an embodiment, for example, the device configuration parameters further include a device password, a device ID number, an alpha-numeric device identifier, an identifier of a room of the facility, an identifier of a sampling location of the facility or any combination of these. In an embodiment, for example, the device does not include a display.

In an embodiment, for example, the tag is capable of being copied by a user so as to allow the device configuration parameters to be encoded as data on a plurality of tags and/or used as the basis for a new set of custom tags. In an embodiment, for example, the system includes a plurality of particle sampling devices provided in one or more user environments, wherein the plurality of tags are configured for use with the plurality of particle sampling devices. In an embodiment, for example, the system is configured such that a user may be provided with an installation tag, copy it, and then create more tags with new locations and IP Addresses without having to remember or re-encode a portion, or all, the settings associated with a specific monitoring environment, process and/or application.

A fourth aspect of the disclosure provides a non-transitory computer-readable medium having stored thereon program instructions for operating a particle sampling device, which, when executed by one or more processors in communication with a tag reader of the device, cause the one or more processors to: receive device operation configuration data, the configuration data including a device password; read, using the tag reader, user data from a tag positioned proximal the device, where the tag includes the user data encoded thereon, the user data including a device user name and the device password; and in response to the device password read from the tag matching the device password of the received configuration data, grant access to the device to a device user for performing device operations, or in response to the device password read from the tag not matching the device password of the received configuration data, deny the device user access to the device.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
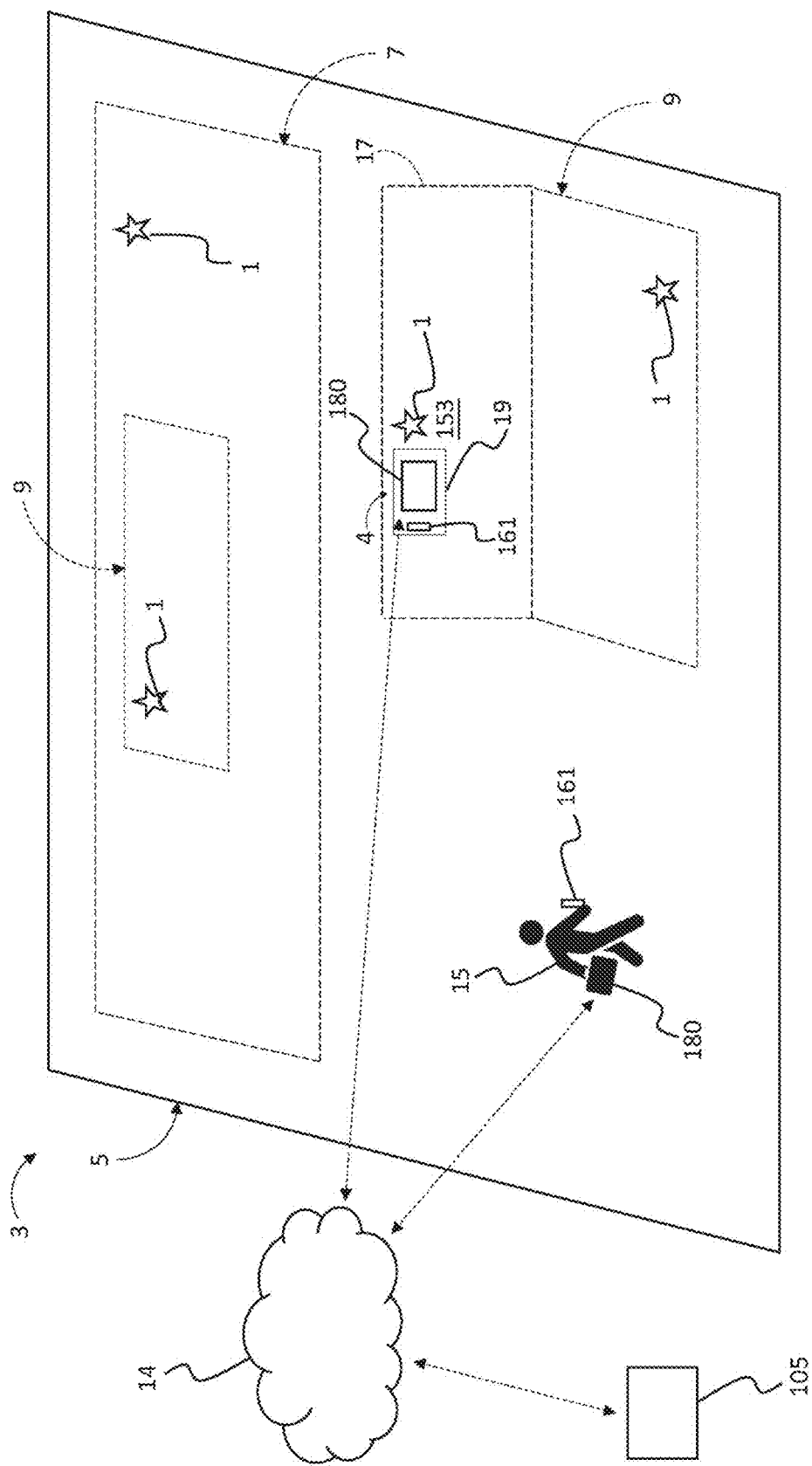
FIG. 1 illustrates a floor plan of a facility environment where particle analysis device(s) may be used.

In the following description, numerous specific details of the devices, device components and methods of the present invention are set forth in order to provide a thorough explanation of the precise nature of the invention. It will be apparent, however, to those of skill in the art that the invention can be practiced without these specific details.

In general, the terms and phrases used herein have their art-recognized meaning, which can be found by reference to standard texts, journal references and contexts known to those skilled in the art. The following definitions are provided to clarify their specific use in the context of the invention.

"Operably connected," "operatively coupled," "operatively connected," and "operatively coupled" refers to a configuration of elements, wherein an action or reaction of one element affects another element, but in a manner that preserves each element's functionality. The connection may be by a direct physical contact between elements. The connection may be indirect, with another element that indirectly connects the 10 operably connected elements. The term also refers to two or more functionally-related components being coupled to one another for purposes of flow of electric current and/or flow of data signals. This coupling of the two or more components may be a wired connection and/or a wireless connection. The two or more components that are so coupled via the wired and/or wireless connection may be proximate one another (e.g., in 15 the same room or in the same housing) or they may be separated by some distance in physical space (e.g., in a different building).

"Particles" refers to small objects which may, for certain applications, be regarded as contaminants. A particle can be any material created by the act of friction, for example, when two surfaces come into mechanical contact and there is mechanical movement. Particles can be composed of aggregates of material, such as dust, dirt, smoke, ash, water, soot, metal, minerals, or any combination of these or other materials or contaminants. "Particles" may also refer to biological particles, for example, viruses, prions, spores and microorganisms including bacteria, fungi, archaea, protists, other single cell microorganisms and specifically those microorganisms having a size on the order of <1-15 µm. A particle may refer to any small object which absorbs, occludes or scatters light and is thus detectable by an optical particle counter. As used herein, "particle" is intended to be exclusive of the individual atoms or molecules of a carrier fluid, for example water molecules, process chemical molecules, oxygen molecules, helium atoms, nitrogen molecules, etc. Certain embodiments of the invention are highly versatile and, thus, capable of detection, sampling and/or characterization of particles having a wide range of sizes and shapes. Exemplary embodiments for certain applications, for example, are capable of detecting, sampling sizing, and/or counting particles comprising aggregates of material characterized by sizes greater than 10 nm, 20 nm, 30 nm, 50 nm, 100 nm, 500 nm, 1 µm or greater, or 10 µm or greater. Exemplary embodiments for certain applications, for example, are capable of detecting, sampling, sizing, and/or counting particles having sizes within the range of 10 nm to 100 µm.

The expression "sampling a particle" broadly refers to collection of particles in a fluid flow, for example, from an environment undergoing monitoring. Sampling in this context includes transfer of particles in a fluid flow to an impact surface, for example, the receiving surface of a growth medium. Alternatively, sampling may refer to passing particles in a fluid through a particle analysis region, for example, for optical detection and/or characterization. Sampling may refer to collection of particles having one or more preselected characteristics, such as size (e.g., cross sectional dimension such as diameter, effective diameter, etc.), particle type (biological or nonbiological, viable or nonviable, etc.) or particle composition. Sampling may optionally include analysis of collected particles, for example, via subsequent optical analysis, imaging analysis or visual analysis. Sampling may optionally include growth of viable biological particles, for sample, via an incubation process involving a growth medium. A sampler refers to a device for sampling particles.

"Impactor" refers to a device for sampling particles. In some embodiments, an impactor comprises a sample head including one or more intake apertures for sampling a fluid flow containing particles, whereby at least a portion of the particles are directed onto an impact surface for collection, such as the receiving surface of a growth medium (e.g., culture medium such as agar, broth, etc.) or a substrate such as a filter. Impactors of some embodiments, provide a change of direction of the flow after passage through the intake apertures, wherein particles having preselected characteristics (e.g., size greater than a threshold value) do not make the change in direction and, thus, are received by the impact surface.

"Impinger" refers to an enclosed sampling device designed to contain a fluid to capture particles from an environmental fluid due to an interaction between the particles and the impinger fluid. For example, an impinger may contain a liquid allowing for particles in a vapor to become suspended within the liquid and not be later removed due to flow of the vapor over the surface or through the liquid media. Impingers may use water, condensates, polar fluids, non-polar fluids and solvents.

The expression "detecting a particle" broadly refers to sensing, identifying the presence of and/or characterizing a particle. In some embodiments, detecting a particle refers to counting particles. In some embodiments, detecting a particle refers to characterizing and/or measuring a physical characteristic of a particle, such as diameter, cross sectional dimension, shape, size, aerodynamic size, or any combination of these. A particle counter is a device for counting the number of particles in a fluid or volume of fluid, and optionally may also provide for characterization of the particles, for example, on the basis of size (e.g., cross sectional dimension such as diameter or effective diameter), particle type (e.g. biological or nonbiological), or particle composition. An optical particle counter is a device that detects particles by measuring scattering, emission, extinction or absorbance of light by particles.

"Flow direction" refers to an axis parallel to the direction the bulk of a fluid is moving when a fluid is flowing. For fluid flowing through a straight flow cell, the flow direction is parallel to the path the bulk of the fluid takes. For fluid flowing through a curved flow cell, the flow direction may be considered tangential to the path the bulk of the fluid takes.

"Fluid (or flow) communication" refers to the arrangement of two or more objects such that a fluid can be transported to, past, through or from one object to another. For example, in some embodiments two objects are in fluid communication with one another if a fluid flow path is provided directly between the two objects. In some embodiments, two objects are in fluid communication with one another if a fluid flow path is provided indirectly between the two objects, such as by including one or more other objects or flow paths between the two objects. For example, in one embodiment, the following components of a particle impactor are in fluid communication with one another: one or more intake apertures, an impact surface, a fluid outlet, a flow restriction, a pressure sensor, a flow-generating device. In one embodiment, two objects present in a body of fluid are not necessarily in fluid communication with one another unless fluid from the first object is drawn to, past and/or through the second object, such as along a flow path.

FIG. 1 illustrates a floor plan of a facility 3 environment where one or more particle analysis device(s) 180 may be used. Facility 3 may include a plurality of spatial tiers. The spatial tiers of the facility 3 are characterized from a high level perspective of the entire facility down to specific sub spaces of and/or inside facility 3. In an embodiment, the spatial tiers include: at least one building 5 (e.g., as the facility 3), at least one area 7, and at least one room 9. In FIG. 1, facility 3 is illustrated without exterior walls, a roof, and similar structures solely for purposes of clarity, and not to imply that the disclosed embodiments are particularly suited to certain types of facilities; this is not the case.

In the case of a portable particle analysis device 180, a user 15 may be tasked to carry the device 180 to perform sampling of at least one sampling location 1 in the facility 3. To do so, user 15 enters facility 3 and navigates through facility 3 to the sampling location(s) 1. While, for instance, walking through the facility 3, user 15 carries the portable particle analysis device 180 during the course of entering and exiting area(s) 7 and/or room(s) 9 to and/or from the sampling location(s) 1.

Alternatively, or additionally, the particle analysis device 180 may be positioned in facility 3 in a "headless" configuration. As shown in FIG. 1, such a device 180 may be mounted to a wall 17 of a facility 3 room 9. A wall plate 19 may be positioned on wall 17 to facilitate mounting the device 180 on the wall 17 in the headless configuration.

Figure 2:
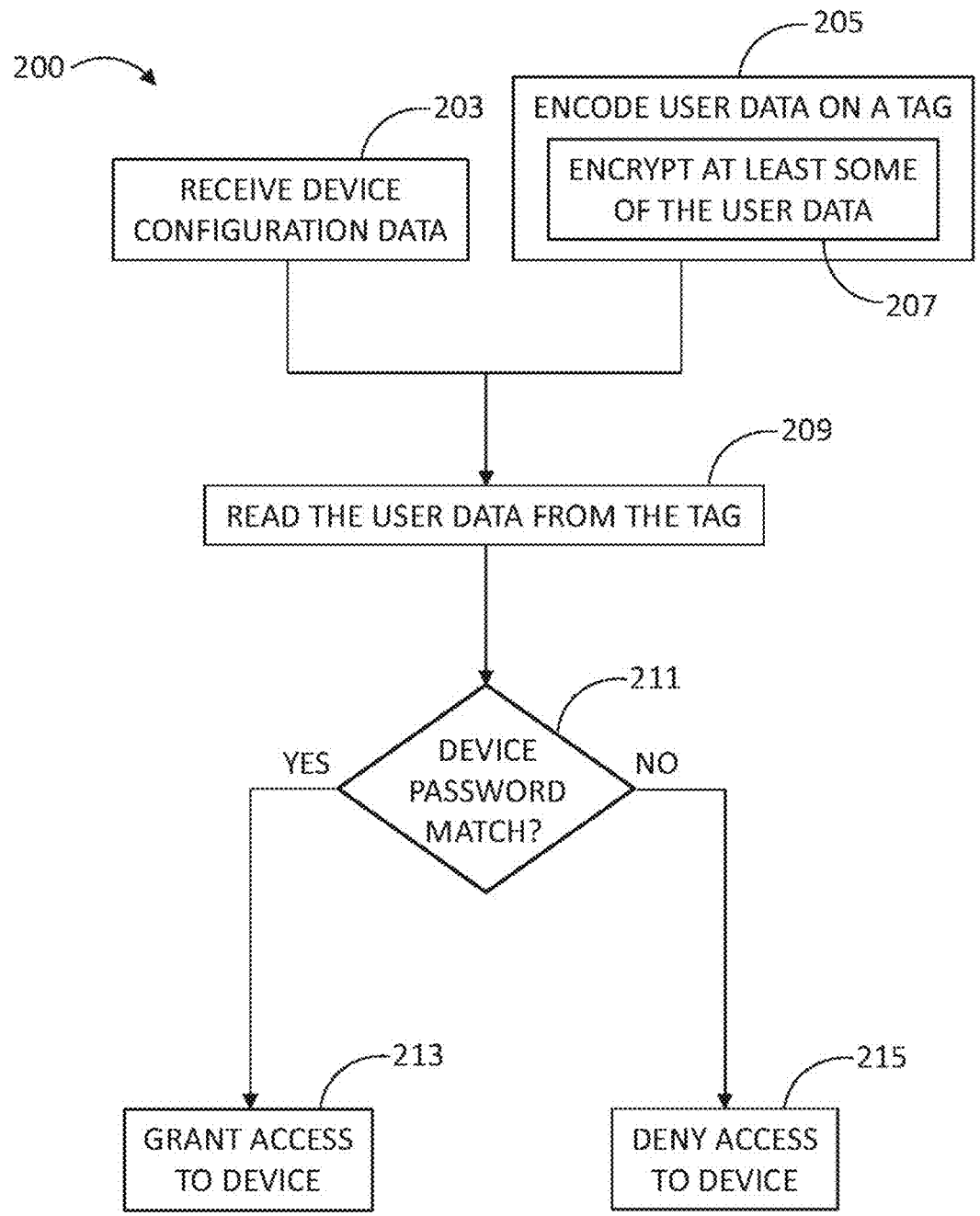
FIG. 2 illustrates a flow chart of a method of operating the particle analysis device(s) shown in FIG. 1.

FIG. 2 illustrates a flow chart of a method 200 of operating the particle analysis device 180 shown in FIG. 1, in accordance with an embodiment. Although method 200 is described in the context of a computer-implemented method performed by one or more processors, the method 200 may also be performed by a program, custom circuitry, or by a combination of custom circuitry and a program. For example, the method 200 may be executed by a CPU (central processing unit), a GPU (graphics processing unit), or any processor, micro-controller, or application-specific integrated circuit (ASIC) capable of implementing, at least in part, the processes and steps described herein with respect to the various embodiments of method 200. For instance, method 200 may be implemented by particle analysis device 180 functioning as an embedded system. Furthermore, persons of ordinary skill in the art will understand that any system that performs method 200 is within the scope and spirit of embodiments of the present disclosure.

Figure 3:
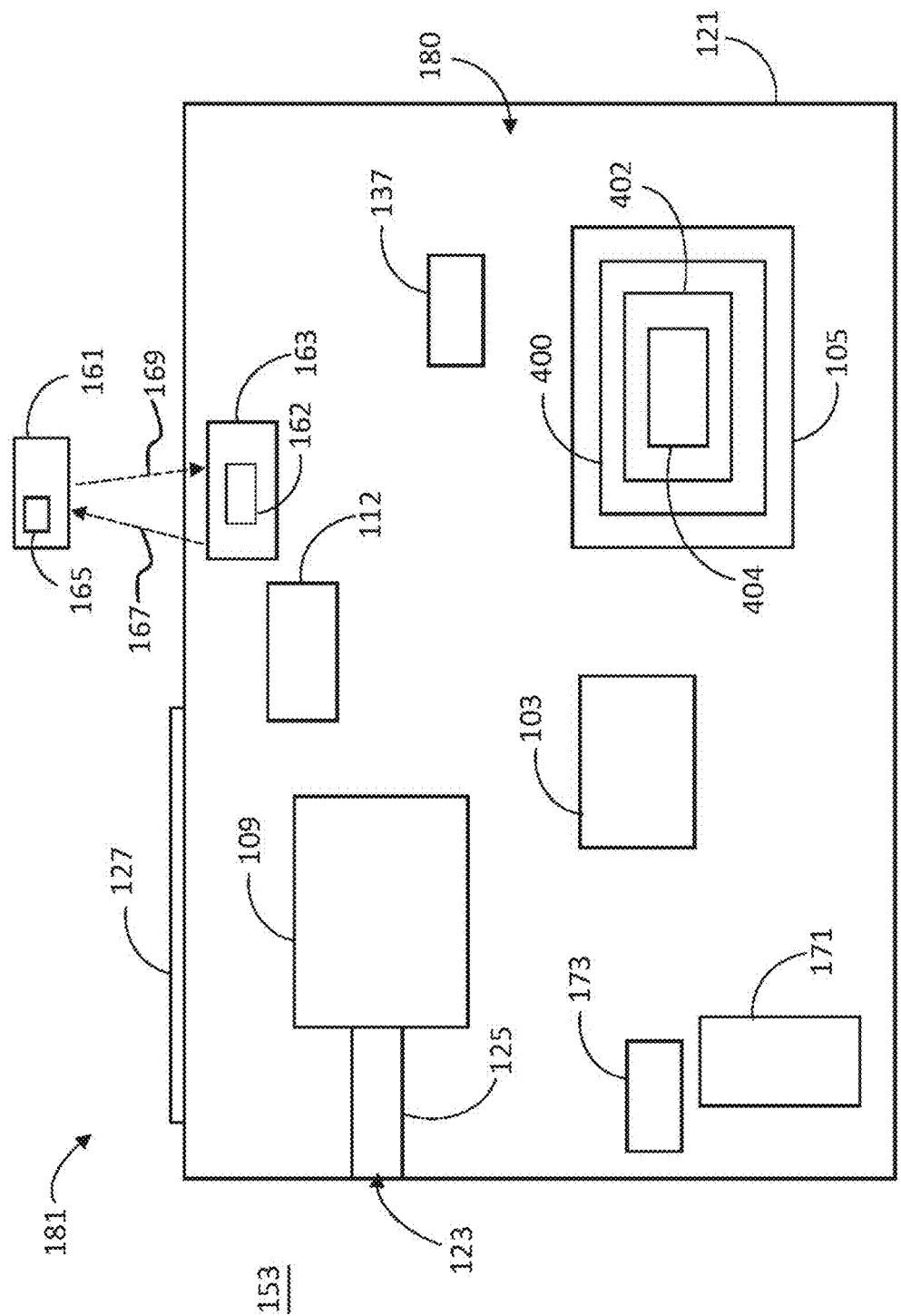
FIG. 3 illustrates features of a system for operating the particle analysis device(s) shown in FIG. 1 that may be used with the method of FIG. 2, according to an embodiment of the disclosure.

FIG. 3 illustrates features of a system 181 for operating the particle analysis device 180 shown in FIG. 1 that may be used with the method 200 of FIG. 2, according to an embodiment of the disclosure. System 181 includes one or more tags 161 for encoding data thereon. Tag(s) 161 may be NFC tag(s) 161 and/or radio frequency identification (RFID) tag(s) 161. Data encoded on the tag(s) 161 for use in method 200 as described herein is added to the tag(s) 161 and read from the tag(s) 161 according to techniques familiar to persons having ordinary skill in the art. In system 181 embodiments using NFC tag(s) 161, the NFC tag(s) 161 may be passive NFC tag(s) 161. Additionally, or alternatively, NFC tag(s) may be active NFC tag(s) 161 including at least one battery, analog electronics, and/or digital electronic component(s) 165 positioned in or on the NFC tag(s) 161 in addition to the NFC coil(s) which are used to encode the data on the NFC tag(s) 161 according to known techniques. In the case of either the active or passive NFC tag(s) 161, or the RFID tag(s) 161, the tag(s) 161 are configured to wirelessly communicate with components and subsystems of the device 180 to enable performance, at least in part, of one or more of the steps of method 200, as described herein.

Device 180 includes a device housing 121. A carrying handle (not shown) may be coupled to the housing 121 or otherwise be positioned through and/or on housing 121 to facilitate user 15 carrying device 180. The device housing 121 includes a sampling port 123. The device 180 includes a particle sampler 125 positioned in the housing 121 and in flow communication with the sampling port 123. The sampler 125 facilitates the device 180 accomplishing, in conjunction with the other described components of device 180, sampling of particles of an exterior environment 153 of the device 180. The device 180 includes a sample analyzer 109, and a display 127 visible to the user 15 of the device 180. In one embodiment, the sampler 125 and/or analyzer 109 is or includes an optical particle counter. In another embodiment, the sampler 125 and/or analyzer 109 is or includes an impactor. In yet another embodiment, the sampler 125 and/or analyzer 109 is or includes an impinger. In still another embodiment, the sampler 125 and/or analyzer 109 is or includes any combination of the optical particle counter, the impactor, and the impinger.

Device 180 includes a tag reader 162. The tag reader 162 includes a tag reader transceiver 163 operably coupled thereto. In the case of NFC tag(s) 161, the tag reader transceiver 163 of tag reader 162 wirelessly transmits a radio signal to the NFC tag(s) 161 as an incoming (e.g., interrogation) tag signal 167 thereto. The NFC tag(s) 161 receive the incoming tag signal 167, which in turn causes the NFC tag(s) 161 to generate and wirelessly transmit an outgoing (e.g., response) tag signal 169. The outgoing tag signal 169 carries data encoded on the NFC tag(s) 161, which is received by the tag reader transceiver 163, and decoded by tag reader 162 and/or processor 103, for further processing and manipulation for use in method 200, as described herein.

Device 180 may include at least one input/output (I/O) device 112 positioned on or in device 180. Among several possible uses for I/O device(s) 112—e.g., to control a brightness, contrast, etc. of display 127, to power device 180 on and off, and/or place processor 103 in a low power or sleep mode state—I/O device 112 may facilitate user 15 providing and/or initiating actions and inputs for processor 103 to facilitate performing, at least in part, one or more of the disclosed steps of method 200.

Device 180 includes a power supply 171 positioned on or in housing 121. In portable embodiments of device 180, the power supply 171 includes one or more rechargeable or non-rechargeable batteries. For rechargeable batteries, device 180 may include analog and/or digital electronics and circuitry for receiving electric power from a source external the housing 121 for recharging the battery(ies). Additionally, or alternatively, the power supply 121 includes a power cable (not shown in FIG. 2) adapted to plug into a power outlet in facility 3, or elsewhere. In particular, non-portable and/or semi-portable device 180 embodiments (e.g., the "headless" device 180 configuration described in further detail below) are suited to use the power cable input to power the various components and subsystems of device 180, either instead of or in addition to using batteries.

Device 180 includes a data transfer interface 173 adapted to transmit and/or receive operational data such as the configuration data used in method 200, as described herein. The interface 173 may include one or more of a serial and/or parallel communication cable outlet, an Ethernet and/or telephone cable outlet, a disk drive (e.g., floppy disk, flash, CD-ROM, DVD-ROM, and/or USB disk), and/or any other physical component adapted to receive a physical data storage medium or a physical cable for receiving and transmitting data to locations external the housing 121 of device 180. Such data transfer and/or receipt using interface 173 may also be accomplished for purposes of "cloning" configuration data and/or other operational data to, from, and amongst a plurality of devices 180. Alternatively, or additionally, any of the above-described uses for data receipt and/or transfer may be accomplished through wireless communication protocols (e.g., WiFi, Bluetooth, cellular, etc.) using, for example, a transceiver 137 of the device 180. In an example, the functionality of transceiver 137 for such wireless data receipt and/or transfer is assumed, at least in part, by the tag reader transceiver 163.

The device 180 includes one or more processors 103 (collectively referred to herein simply as "processor 103") in communication with: tag reader 162, tag reader transceiver 163, power supply 171, transceiver 137, interface 173, display 127, sample analyzer 109, I/O device(s) 112, and at least one memory device 105 (collectively referred to herein simply as "memory 105"). In one embodiment, memory 105 is positioned in or on device housing 121. Instead, or additionally, in another embodiment, memory 105 is positioned outside of and/or remote from device housing 121. In such other embodiments, processor 103 and memory 105 are in communication with one another via, and communicate with one another using signals (e.g., encoded data signals) sent and/or received through, a network 14, as shown in FIG. 1. In an example, communication among and between processor 103 and remote memory 105 using network 14 includes wireless communication equipment and protocols. Wireless communication among and between device 180 processor 103 and remote memory 105 is facilitated by transceivers positioned in or on device 180 (e.g., transceiver 137) and/or elsewhere in facility 3 (e.g., WiFi routers and/or modems) (not shown in FIG. 1). In another example, communication using network 14 includes wired communication equipment and protocols. In yet another example, network 14 communication includes a combination of wireless and wired communication equipment and protocols. In an example, communication among and between device 180 processor and remote memory 105 includes wireless and/or wired communication equipment and protocols for utilizing cloud-based processing, storage, and/or communication resources. In an example, network 14 communication utilizes the Internet, including, without limitation, Internet of Things (IoT) protocols, practices, and/or standards.

In an example, memory 105 is or includes a non-transitory computer-readable medium 400. Non-transitory computer-readable medium 400 stores as software 402 processor-executable instructions for operating the particle analysis device 180 in accordance with, for example, the disclosed embodiments of method 200. In an example, processor-executable instructions stored as software 402 includes one or more software modules 404. When executed by processor(s) 103 that are in communication with memory 105, the processor-executable instructions cause the processor(s) 103 to implement and/or otherwise perform, at least in part, one or more of the disclosed operations, steps, and/or processes of method 200, as described herein. "Software" (e.g., software 402) is used synonymously with "firmware" throughout the entire disclosure.

In one embodiment, step 203 of method 200 is performed and/or otherwise facilitated, at least in part, by processor 103 executing software instructions stored in a configuration data receiving module 404. In another embodiment, step 209 of method 200 is performed and/or otherwise facilitated, at least in part, by processor 103 executing software instructions stored in a user data reading module 404. In yet another embodiment, step 211 of method 200 is performed and/or otherwise facilitated, at least in part, by processor 103 executing software instructions stored in a password matching module 404. In still another embodiment, step(s) 213 and/or 215 of method 200 is performed and/or otherwise facilitated, at least in part, by processor 103 executing software instructions stored in a device access control module 404. In another embodiment, all of the method 200 steps described herein are performed and/or otherwise facilitated, at least in part, by processor 103 executing software instructions stored in a specific functional module(s) 404. As will be appreciated by persons of ordinary skill in the art, the various modules 404 described above may share particular functional blocks, or they have unique blocks not shared by other modules 404. Such modular software design facilitates design, troubleshooting, storage, maintenance, and updating of software 402 for use by system 181 and/or device 180 implementing method 200. Likewise, software instructions stored in memory 105 as module(s) 404 may be organized in a distributed, centralized, or both, architecture, and device 180 may include additional or other hardware and software components to facilitate troubleshooting, cybersecurity, operational auditing, and/or periodic updates to software 402.

In operation of device 180, the air or other medium occupying the space of exterior environment 153 proximal the sampling port 123 of device is drawn in to the particle sampler 125 (e.g., by suction, vacuum, or like mechanisms). A flow path of the air or other medium into the particle sampler 125 portion of device 180 is directed toward the sample analyzer 109 portion of device 180. Instrumentation components in the sample analyzer 109 facilitate various qualitative and/or quantitative analyses of the sampled air or other medium including, for example and without limitation, particle counts and characterization of particle sizes. Such components of device 180 and further details and examples of the analyses that may be performed thereby are described with reference to optical particle counters, for example, in U.S. Pat. Nos. 7,745,469, 7,916,29, and 8,154,724, which are each incorporated by reference in their entireties to the extent they are not inconsistent with the present disclosure. In an example, the analyses performed by the sample analyzer 109 of device 180 result in sample data pertaining to characterization(s) of the sampled particles. These data are stored by processor 103 in memory 105, including in association with the sample location(s) 1, spatial tier(s) thereof, the device user name, and/or other unique identifier(s).

Referring to FIG. 2, and for a use case including a portable particle sampling device 180 being used with the disclosed system 181, at step 203, the device 180 processor 103 receives device operation configuration data. The configuration data includes a device password (e.g., an alphanumeric string of characters). In an example, processor 103 causes the received 203 configuration data to be stored in memory 105. In one embodiment, the processor 103 receives 203 the device configuration data via the data transfer interface 173 and/or the transceiver 137. Similarly, processor 103 of one device 180 of a plurality of devices 180 may receive 203 and store in its memory 105 the device configuration data via interface 173 and/or transceiver 137 from at least a second device 180 of the plurality of devices 180 for cloning purposes, as described above.

In another embodiment, the device 180 is one of a plurality of devices 180 for use in system 181 for performing method 200. In an example, the processor 103 receives 203 the configuration data for at least two of the plurality of devices 180. In a use case, configuration data received 203, and caused to be stored in memory, by processor 103 of a first device 180 may be shared (e.g., by cloning) with the at least a second device 180 of the plurality of devices 180 using the data transfer interface 173 and/or the transceiver 137.

At step 205, user data including a device user name and the device password is encoded on the tag 161. The tag 161 includes a tag ID number uniquely assigned to it. In one embodiment, the tag 161 is manufactured and/or supplied for use in the disclosed devices, systems and methods already having its tag ID number uniquely-assigned to it. In another embodiment, the tag ID number is encoded 205 on the tag 161 in addition to the device user name and the device password. In an example, user data also includes a device access level. In one embodiment, system 181 includes a plurality of tags 161. In the embodiment, the device user name and the device password and, optionally, the tag ID number and/or the device access level, is encoded 205 on a first tag, and data for one or more device recipes is encoded on at least a second tag 161.

As used herein, "recipe" means parametric sampling information, or cleanroom certification parameters. Sampling information may include, but is not limited to, the number of samples, the time or volume to sample, alarm information, as well as which sampling location 1 within a room 9 to sample. Cleanroom certification parameters include the sampling parameters required for a specific room to meet a specific type and class of certification. Device 180 may implement several types of recipes for the sampling and/or analysis, as described herein. In an example, a basic sampling and/or analysis includes: a time for which device 180 will sample air of facility 3 at a respective sampling location 1, a volume of air to be sampled, which may include a flow rate, a number of samples to be taken, and alarm limits, which may be associated with a single sampling location 1 only. In another example, a certification recipe for sampling and/or analysis includes: at least of portion of those parameters described above for the "basic" recipe, along with additional parameters for certifying an entire room 9 having one or more sampling location(s) 1 in it for purposes of standards and/or regulatory guidelines (e.g., ISO, FDA, EMEA, and/or cGMP). Thus, the "certification" recipe type applies to an entire room 9 to be certified. In yet another example, a monitoring recipe includes a superset of the "basic" recipe. Like the "certification" recipe, the monitoring recipe applies to rooms 9, and both require sampling at some specification set of sampling location 1 within a room 9. Using the "monitoring" recipe enables device 180 to execute one or more sampling and/or analysis recipe(s) at multiple sampling locations 1 in a given room 9. As such, the "monitoring" recipe is tied to the room 9, instead of being tied to the sampling location 1.

Method 200 may also include encoding 205 the user data, device access level, and/or device recipe data, and optionally tag ID number(s), on one or more tags 161. In embodiments where system 181 includes a plurality of devices 180 and/or a plurality of users 15 of one or more devices 180, the first tag 161 includes a plurality of first tags 161. In one embodiment, encoding 205 the user data on the first tag 161 includes encoding 205 the same device password on each first tag 161 of the plurality of first tags 161. In another embodiment, the user data includes a plurality of device user names for the plurality of device users 15. In the embodiment, a unique device user name for each of the plurality of users 15 is encoded 205 on each of the plurality of first tags 161. In yet another embodiment, the user data includes a plurality of device access levels, where each of the plurality of device access levels is associated with a respective one or more of the plurality of device user names. In an example, one device access level for one of the plurality of users 15 is encoded 205 on each of the plurality of first tags 161. In another example, two or more device access levels are encoded 205 of each of the plurality of first tags 161.

In another embodiment, at least some of the data encoded 205 on the tag(s) 161 is also encrypted 207 on the tag. Encryption 207 of data encoded 205 on the tag(s) 116 is accomplished using techniques that are familiar to persons having ordinary skill in the art. Encryption 207 of data on the tag(s) 161 provides an added level of security and authentication in operation of system 181 beyond the device 180 password.

More illustrative information will now be set forth regarding further details of various algorithms, architectures, and features with which the foregoing framework may be implemented in performance of method 200, per the desires of the user 15 and/or system 181 administrators. It should be strongly noted that the following information is set forth for illustrative purposes and should not be construed as limiting in any manner. Any of the following features may be optionally incorporated with or without the exclusion of other features described.

Figure 4:
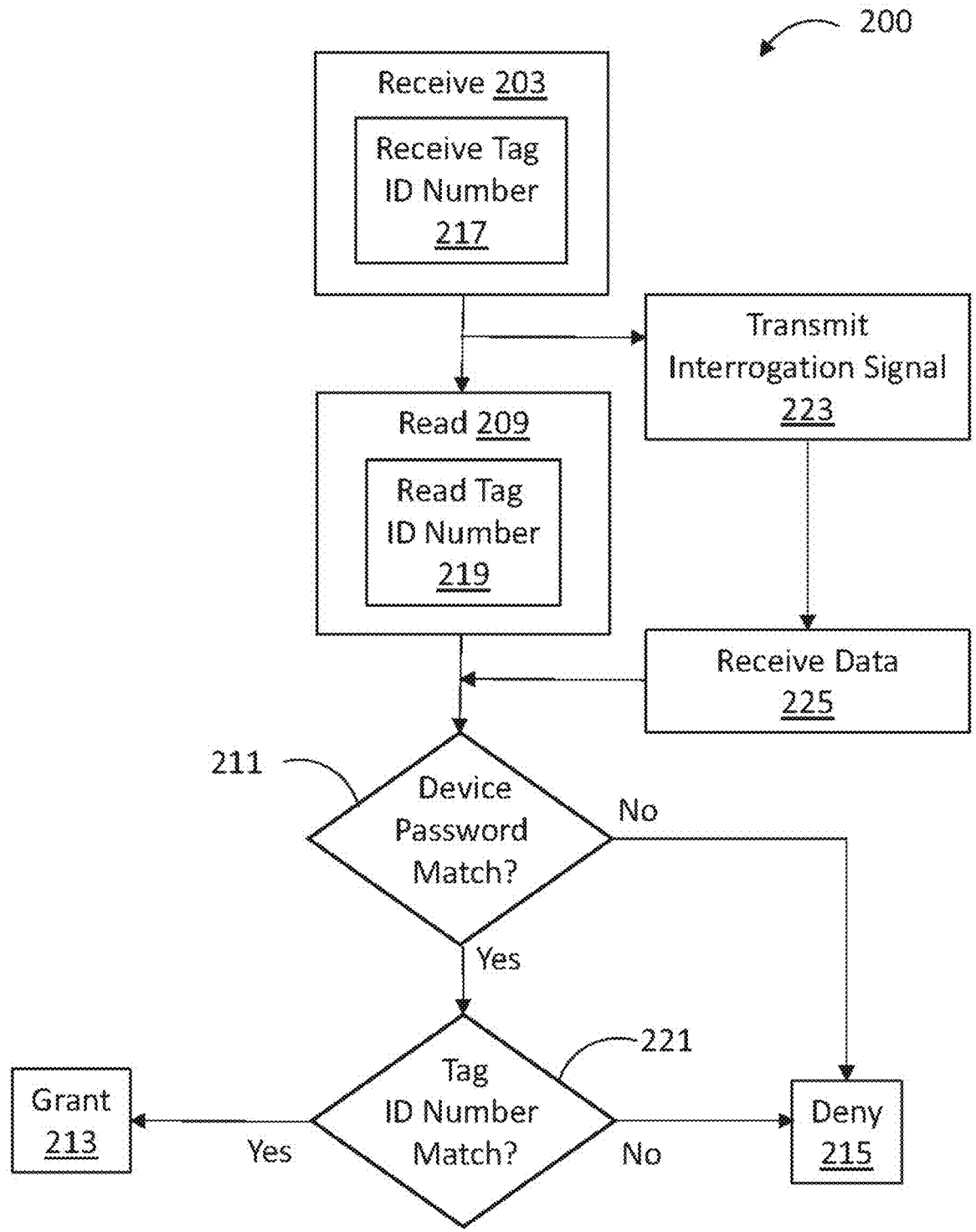
FIGS. 4 and 5 illustrate aspects of the method of FIG. 2, according to some embodiments of the disclosure.
Figure 5:
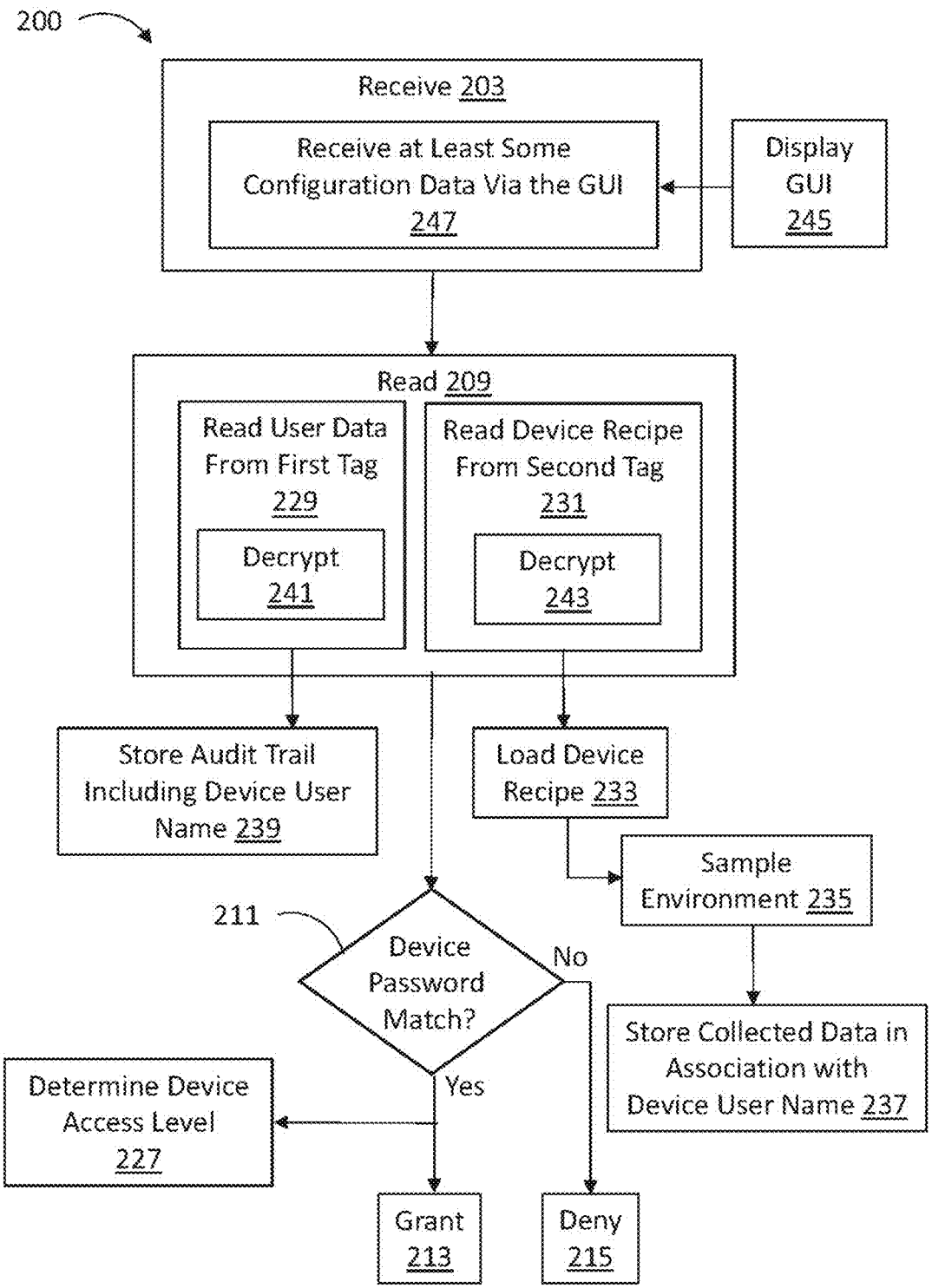

FIGS. 4 and 5 illustrate aspects of the method 200 of FIG. 2, according to some embodiments of the disclosure. The following description of FIGS. 4 and 5 makes reference to FIGS. 1-3 and the features shown and/or numbered therein.

Referring to FIG. 4, in an embodiment, the user data encoded on the tag 161 includes a tag ID number. In the embodiment, the receiving 203 step includes receiving 217 at least one tag ID number associated with at least one tag 161 authorized for use with the device 180 by the device user 15. In an example, the reading 209 step includes reading 219 the tag ID number from the tag 161. Thus, in the example shown in FIG. 4, both the device password read 209 from the tag 161 and the tag ID number read 219 from the tag 161 must match the received 203 device password and the received 217 tag ID number in the configuration data in order for device 180 access to be granted 213.

As in FIG. 2, where the device password does not match 211 the device password of the received 203 configuration data, device 180 access is denied 215. As shown in FIG. 4, where the device password read 209 from the tag 161 does match the device password of the received 203 configuration data, method 200 does not proceed to grant 213 device 180 access to the user 15. Rather, in the example shown in FIG. 4, access to the device 180 is granted 213 only if the tag ID number read 219 from the tag 161 matches 221 the tag ID number of the received 217 configuration data. Otherwise, where the read 209 device password does not match 221 the device password of the received 217 configuration data, device 180 access is denied 215. Including a tag ID number encoded on the tag 161 and reading 219 the tag ID number from the tag 161 in addition to reading 209 the user data from the tag 161 provides an additional layer of authentication and security in method 200.

In embodiments where the tag 161 is or includes an active and/or passive NFC tag 161, the reading step(s) 209 and/or 219 includes transmitting 223 an interrogation signal 167 to the NFC tag 161. In an example, processor(s) 103 cause the interrogation signal 167 to be transmitted 223 to the NFC tag 161 positioned proximal the device 180 using the tag reader transceiver 163 of the tag reader 162, as shown in FIG. 2. In the embodiment, the reading step(s) 209 and/or 219 includes receiving 225 a response signal 169 carrying the user data and/or the tag ID number from the NFC tag 161 in response to transmitting 223 the interrogation signal 167. In an example, processor(s) 103 cause the response signal 169 to be received 225 from the NFC tag 161 positioned proximal the device 180 using the tag reader transceiver 163 of the tag reader 162, as shown in FIG. 2.

Referring to FIG. 5, in an embodiment, the received 203 configuration data includes a device access level. In the embodiment, method 200 includes determining 227 the device access level associated with the device user name read 209 from the tag 161. In an example, the device access level is determined 227 in response to the device password read 209 from the tag 161 matching 211 the device password of the received 203 configuration data. Thus, the user 15 granted 213 access to the device 180 will be provided with the appropriate determined 227 device access level (e.g., privileges) for performing device 180 operations.

System 181 may include a first tag 161 and a second tag 161 for use in method 200. In an embodiment, the reading step 209 includes reading 229 the user data from the first tag 161 positioned proximal the device 180. In a use case, the device 180 is a portable device 180 being hand carried by user 15 along with the first tag 161. In an example, method 200 includes reading 231 a device recipe from the second tag 161 positioned proximal the device 180. In the use case of the portable device 180, the user 15 carrying the device 180 and the first tag 161 may transport the device 180 to a room 9 of the facility 3, and the second tag 161 may be present in that room 9. The second tag 161 may remain present in the room 9 so that any portable device(s) 180 transported to that room 9 to be used for particle sampling of locations 1 in that room 9 will utilize the same second tag for the reading 231 step. In the embodiment, method 200 includes loading 233 the device recipe read 231 from the second tag 161 to enable the device 180 and/or the user 15 to perform the device 180 operations according the device recipe following granting 213 of access. In another example, one tag 161, rather than two tags 161, has both the user data and the device recipe encoded thereon.

The device recipe includes one or more of a sampling time, volume of air to be sampled, a flow rate, a number of samples to be taken, alarm limits, sampling location and any combination of these. In an example, the device recipe may include: multi-tiered location information including: the area 7, the room 9, and the sampling location(s) 1 within a particular room 9. In another embodiment, the device recipe includes one or more of: a sampling type, and a room certification type. Based on the operational requirements for particle sampling of a facility 3, the contents of the loaded 233 device recipe provides instructions to the device 180 processor 103 and/or the device 180 user 15 to facilitate that particle sampling is completed according to those requirements. U.S. patent application Ser. No. 16/394,931 (filed Apr. 25, 2019), which is incorporated by reference herein in its entirety, provides examples of beneficial aspects for operation of particle sampling devices such as device 180 for incorporating facility 3 spatial tiers (e.g., area 7, room 9, sampling location(s) 1) into the loaded 233 device recipe.

The loaded 233 device recipe facilitates the device 180 particle sampling and/or particle analysis, including with any necessary user 15 interaction and/or additional actions by the user 15 beyond the user 15 bringing the device 180 to the sampling location(s) 1. In one embodiment, the processor 103 causes the read 231 device recipe to be stored in memory 105. In an example, device 180 and/or user 15 samples particles and/or performs additional or other tasks using the device 180 at the sampling location(s) 1 according to the recipe loaded 233 from memory 105.

In an embodiment, upon the device recipe being loaded 233, method 200 includes sampling 235 the space of the exterior environment 153 of the device 180 according to the device recipe read 231 from the second tag 161. In an example, the processor 103 causes data collected through the sampling 235 and any accompanying sample analysis of particles sampled 235 by device 180 to be stored 237 in memory 105 in association with the device user name read 229 from the first tag 161. Alternatively, or additionally, processor 103 causes an audit trail for the user 15 performed device 180 operations to be stored 239 in memory 105 after access is granted 213 in method 200. The stored 239 audit trail includes the device user name read 229 from the first tag 161. In an example, the stored 239 audit trail also includes information regarding the nature of device 180 operations performed by the user 15 and/or metadata (e.g., time/date stamps) for such device 180 operations. In another example, the performed device 180 operations include the operations performed using device 180 for the sampling 235 step in method 200.

Following the device 180 operations being performed by user 15 and/or the sampling 236 of particles and/or analysis of particle-related and/or other data, processor 103 may, either automatically or in response to a user 15 command, cause a stored 237 data report and/or a stored 239 audit trail report to be generated and displayed (e.g. on display 127), transmitted (e.g., using transceiver 127 and/or interface 173) to a computing device external to the housing 121, and/or printed (using a printer, not shown) in communication with device 180 (e.g., via a wired connection to interface 173 or via a wireless connection via the transceiver 137). Processor 103 may further cause such generated reports(s) to be stored in device memory 105 (e.g., as .pdf files) and/or to be stored in memory 105 remote from the housing 121 (e.g., in the "cloud").

In embodiments of system 181 and method 200 where at least some of the data encoded 205 on the tag(s) 161 is encrypted 207 on the tag 161, for the reading 209 step, the data encoded 205 on the tag(s) 161 is received by tag reader transceiver 162 and subsequently or concurrently decoded and decrypted by the tag reader 163 and/or the processor 103. In one embodiment, reading 229 the user data, tag ID number, and/or device access level from the first tag 161 includes decrypting 241 at least some of these data encoded 205 on the first tag 161 for further use in method 200, as described herein. Alternatively, or additionally, reading 231 the data for the device recipe from the second tag 161 includes decrypting 243 at least some of this data encoded 205 on the second tag 161 for further use in method 200, as described herein.

In an embodiment, the processor 103 causes a GUI to be displayed on the device 180 display 127. In an example, the receiving step 203 of method 200 includes receiving 247 at least some of the device 180 configuration data via the GUI.

Figure 6:
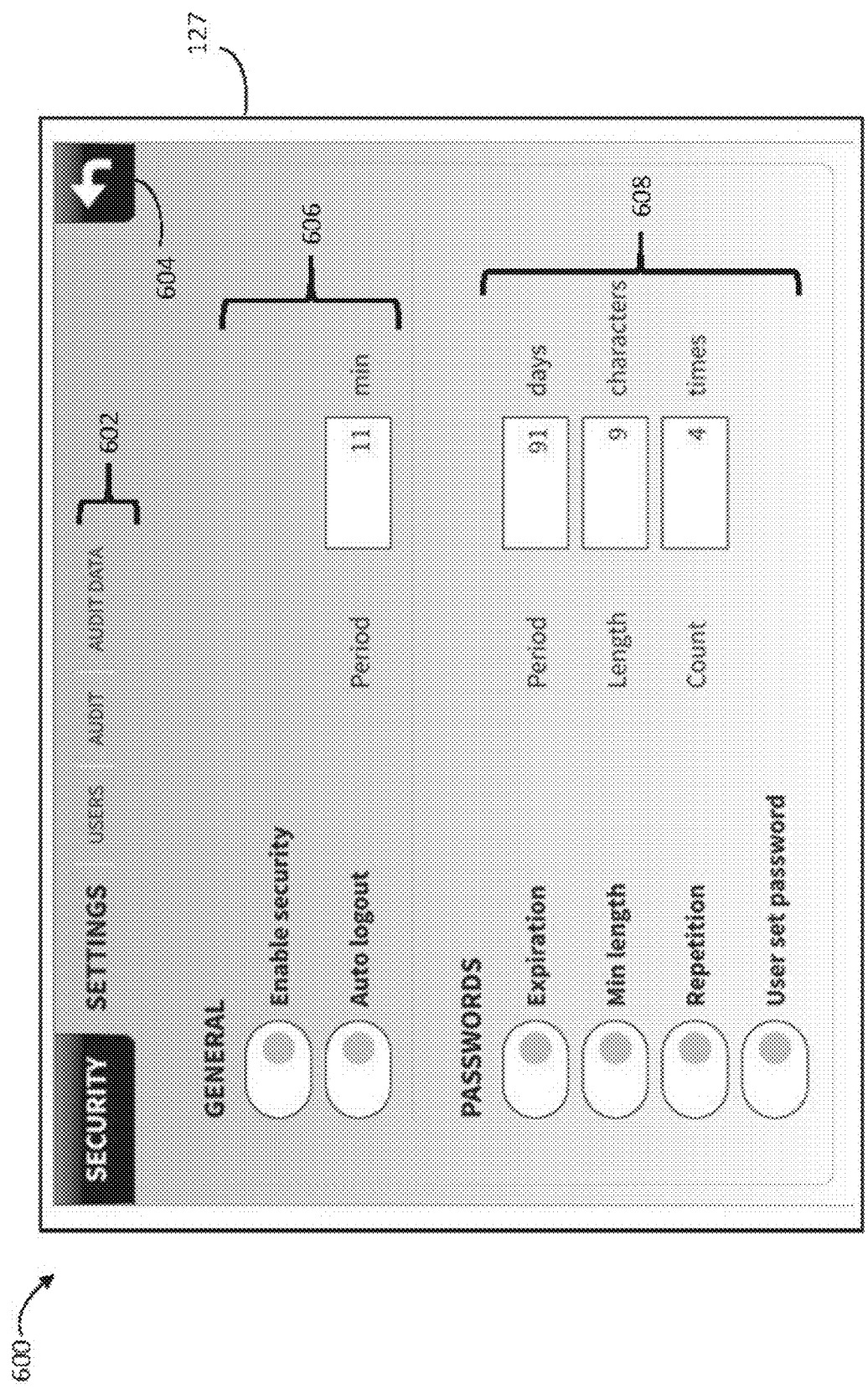
FIGS. 6-8 illustrate screens and operational aspects of a graphical user interface (GUI) of the device of FIG. 3, according to some embodiments of the disclosure.
Figure 7:
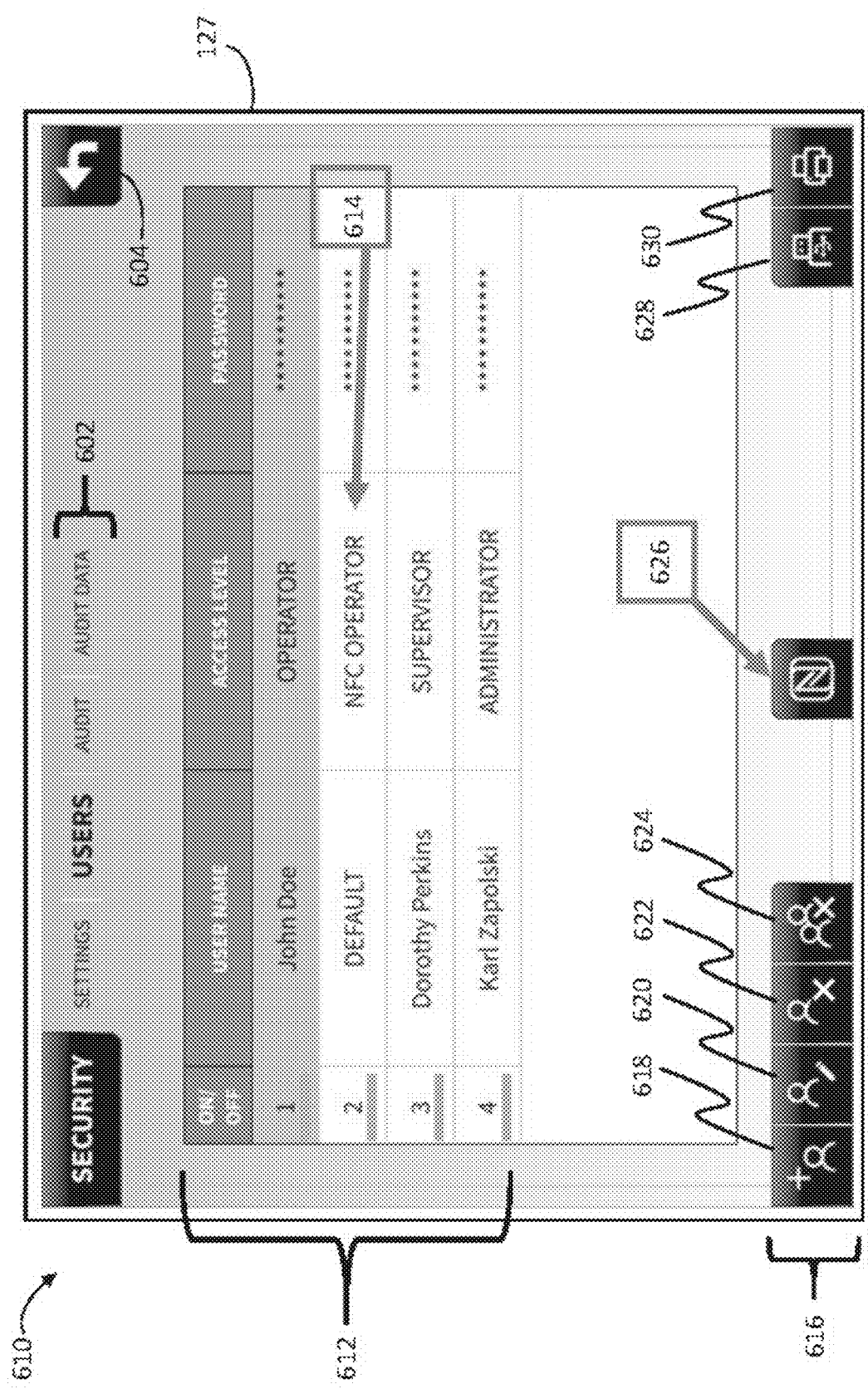
Figure 8:
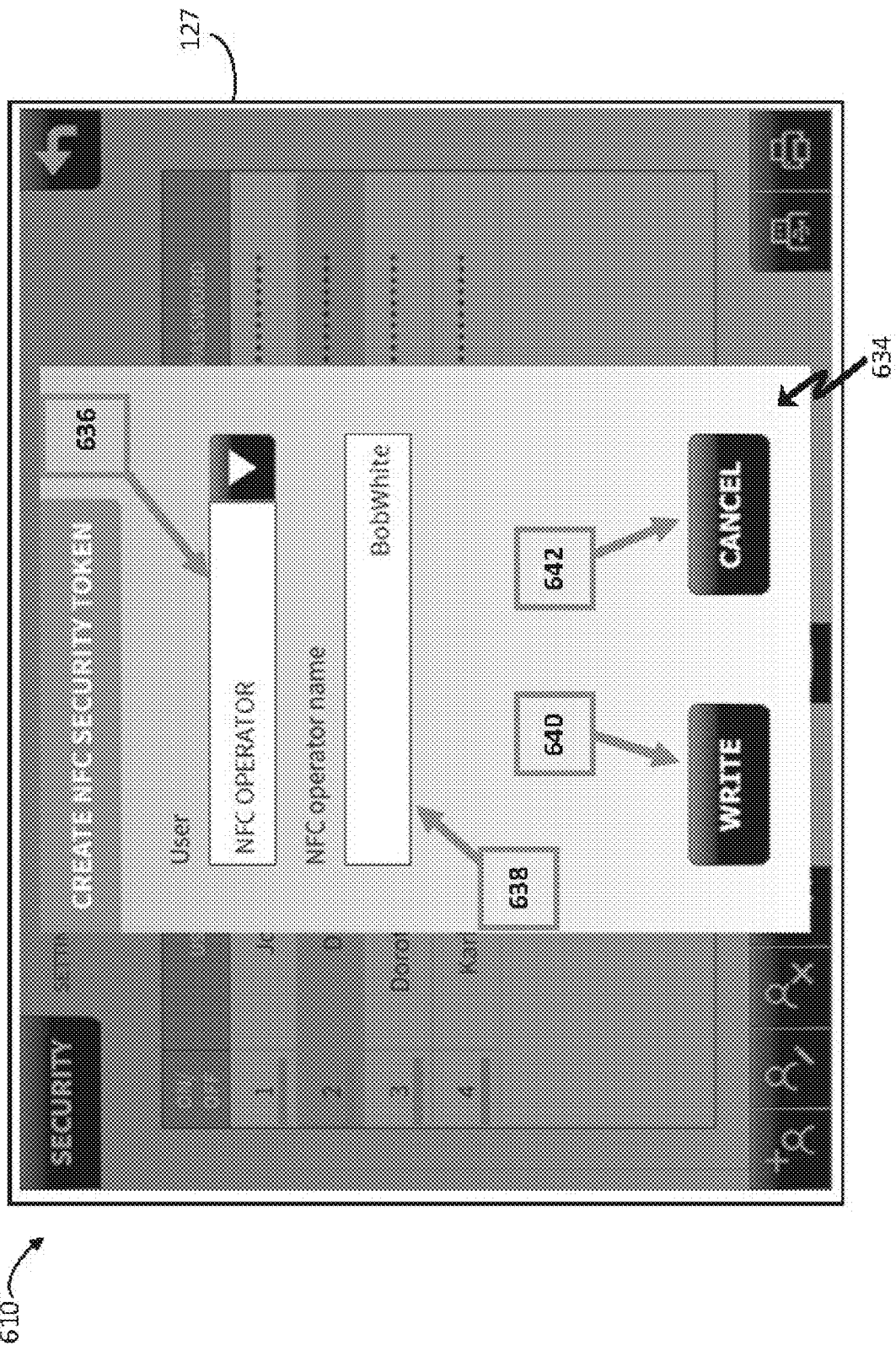

FIGS. 6-8 illustrate screens and operational aspects of GUI of the device 180 of FIG. 3, according to some embodiments of the disclosure.

Referring to FIG. 6, a first GUI screen 600 on the display 127 includes a toolbar 602 graphics with a plurality of tabs for selecting categories related to device 180 security. Users 15 may select a desired tab by touching the toolbar 602 at the desired location. The first GUI screen 600 includes a back button 604 that, upon being touched by the user 15, returns the GUI on the display 127 to the previously shown screen. In the example shown in FIG. 6, the "Settings" tab is selected from the toolbar 602 and the first GUI screen 600 is thereby displayed on the display 127.

The first GUI screen 600 for the Security Settings tab includes a graphics set 606 for general security settings. Graphics set 606 includes a first plurality of toggle switches that, upon being touched by the user 15, alternately toggle from on (enabled) to/from off (disabled) states. In the example shown in FIG. 6, a first toggle switch for "enable security" and a second toggle switch for "auto logout" are present in graphics set 606, and both of them are enabled in the on position. In an example, where the "enable security" toggle switch is disabled, the "auto logout" toggle switch is "grayed out" so as to prevent a user 15 touching it from having any effect to change that setting. Where the "enable security" toggle switch is enabled, and the "auto logout" toggle switch is also enabled, user 15 may then specify an auto logout time period for which the device 180 will lock and require a renewed login after the specified time period elapses without any user 15 GUI interactions or device 180 operations taking place. In an example, upon the user 15 touching the text box (e.g., having "11" entered as shown in FIG. 6), the processor 103 causes a touch keyboard to be displayed over the first GUI screen 600. User 15 touching the touch keyboard enables him or her to change the value in the text box (e.g., from "11" to "5").

The first GUI screen 600 for the Security Settings tab includes a graphics set 608 for password settings. Graphics set 608 includes a second plurality of toggle switches that, upon being touched by the user 15, alternately toggle from on (enabled) to/from off (disabled) states. In the example shown in FIG. 6, each of the second plurality of toggle switches are enabled with all the toggle switches in their on positions. A third toggle switch for "expiration" is present in graphics set 608 in the on position to enable user 15 to specify an expiration period for passwords by entering a nonzero numerical value in the accompanying text box for the number of days (e.g., "91") before a newly created password will expire. With the third toggle switch enabled, user 15 touching the accompanying text box leads to the touch keyboard being displayed over the first GUI screen 600 for entering the desired expiration value, as described above with reference to the second toggle switch of graphics set 606.

A fourth toggle switch for "min length" is present in graphics set 608 in the on position to enable user 15 to specify a minimum length for (i.e., number of) characters required for a newly created password by entering a nonzero numerical value in the accompanying text box for the number of characters (e.g., "9"). With the fourth toggle switch enabled, user 15 touching the accompanying text box leads to the touch keyboard being displayed over the first GUI screen 600 for entering the desired character length value, as described above with reference to the second toggle switch of graphics set 606.

A fifth toggle switch for "repetition" is present in graphics set 608 in the on position to enable user 15 to specify a count value for a maximum number of times a user 15 may repeat use of a previously used password by entering a numerical value that is greater than or equal to zero in the accompanying text box for the count (e.g., "4"). With the fifth toggle switch enabled, user 15 touching the accompanying text box leads to the touch keyboard being displayed over the first GUI screen 600 for entering the desired count value, as described above with reference to the second toggle switch of graphics set 606.

A sixth toggle switch for "user set password" is present in graphics set 608 in the on position to enable user 15 to specify that users 15 may set their own passwords. With the sixth toggle switch disabled, on the other hand, heightened administrative privileges are required for setting user 15 passwords for device 180. In an example, a device 180 administrator establishes user 15 passwords, and the respective users 15 may or may not know their actual password.

Referring to FIG. 7, a second GUI screen 610 on the display 127 includes the toolbar 602 and the back button 604. In the example shown in FIG. 7, the "Users" tab is selected from the toolbar 602 and the second GUI screen 610 is thereby displayed on the display 127.

The second GUI screen 610 for the Users tab includes a graphics set 612. The second GUI screen 610 enables generating a table of user name/password combinations as well as writing (e.g., encoding 205) data to NFC security tags 161. Graphics set 612 includes a tabular listing of rows, with each row having respective column entries for a user's 15 user name, his/her device access level, the respective user's 15 password. As shown in FIG. 7, the leftmost column of the graphics set 612 table contains row entries for whether or not one or more of the listed users 15 are active ("on/off"). In the illustrated example, all of the users 15 listed in the graphics set 612 table are active, as indicated by the row number indicator value (e.g., "1", "2", "3" and "4") being underlined in the table. To alternately activate and deactivate user(s) 15 listed in the graphics set 612 table, a user 15 touches the row/column box in the left most column, which in turn alternately provides and removes the underlining of the row number indicator value. This allows for inactivating user(s) 15, rather than deleting them.

User 15 of the second GUI screen 610 may utilize a graphics set 616 thereon for adding, deleting, and editing properties of users 15 in the graphics set 612 table. To add a new user 15 row to the table, touching a new user add button 618 causes processor 103 to add a new row to the table with a sequential row number added in the leftmost column. Upon the user 15 touching the empty box for the new row under the "user name" column, the touch keyboard appears over the second GUI screen 610, and the new user name is typed in. Touching the empty box for the new row under the "access level" column causes processor to place a dropdown selection listing over the second GUI screen 610 for the user 15 to select the desired access level to be associated with the newly added user 15. Although more access level indicators are possible depending on the particular desires and requirements of device 180 owners (e.g., an NFC supervisor and/or an NFC administrator), FIG. 7 shows four different access levels in the graphics set 612 table: operator, NFC operator, supervisor, and administrator.

In one embodiment, after data is entered in the table of graphics set 612, they are locked, and further touching of row/column boxes in the table will have no effect. In an example, user 15 of the second GUI screen 610 may edit properties of user(s) 15 listed in the table by touching a user edit button 620 in graphics set 616. Touching the user edit button 620 causes processor 103 to unlock the row/column boxes of the graphics set 612 table to enable user 15 touch interactions therewith. For example, a box 614 in FIG. 7 is illustrated as having the "NFC operator" access level for the user name "default." After touching the user edit button 620, user 15 of second GUI screen 610 may touch box 614 to change the access level using the drop down selection listing. Similarly, the user name box at left of and adjacent to box 614 may be touched so as to edit the user name from "default" to an actual person's name, for instance.

Alternatively, or additionally, user 15 of second GUI screen 610 may touch the password box at right of and adjacent to box 614 so as to edit the password for the respective user 15 listed in the graphics set 612 table. In an example, each of the plurality of users 15 are assigned and/or assign themselves a unique password. In another example, each of the plurality of users 15 are assigned and/or assign themselves the same password. In yet another embodiment, a first group of users 15 (e.g., grouped according to assigned device access level) are assigned a first unique password, while at least a second set of users 15 are assigned at least a second unique password. With the table unlocked after touching the user edit button 620, the leftmost column box for the respective user 15 may be touched to alternately change the user's 15 status to/from active and inactive, as described above.

User 15 of the second GUI screen 610 may delete either a single user 15 or multiple users 15 from graphics set 612 table by touching a single user delete button 622 or a multiple user delete button 624, respectively. Touching the single user delete button 622 enables user 15 of the second GUI screen 610 to select just one row at a time from the table. In an example, with that one row selected, touching the single user delete button 622 a second time will cause processor 103 to display a single user delete confirmation box over the second GUI screen 610, where the single user 15 deletion selection may be confirmed or cancelled. Likewise, touching the multiple user delete button 624 enables user 15 of the second GUI screen 610 to delete all users from the table. In an example, touching the multiple user delete button 624 will cause processor 103 to display a multiple user delete confirmation box over the second GUI screen 610, where the multiple user 15 deletion selection may be confirmed or cancelled.

Second GUI screen 610 may be utilized, at least in part, for the receiving 203 and/or encoding 205 step(s) of method 200. User 15 of the second GUI screen 610 may save the data contained in the graphics set 612 table to an external storage media (e.g., as a .pdf file to a USB disk plugged into the interface 173) by touching a save button 628 of graphics set 616. By touching a print button 630 of graphics set 616, the second GUI screen 610 user 15 may send the data in the table to an external printer (e.g., via interface 173) to provide a paper report. Entry, deletion, and/or modification of data in graphics set 612 table is stored in memory 105.

User 15 of the second GUI screen 610 may initiate an NFC tag 161 write process by touching a tag write button 626 in graphics set 616. Upon touching the NFC tag write button 626, processor 103 causes a pop-up dialog box 634 to be displayed over the second GUI screen 610, as shown in FIG. 8. In one embodiment, touching the NFC tag write button 626 causes processor 103 to unlock the graphics set 612 table to allow user 15 to select one of the rows therein. With the row selected for a particular user 15 listed in the table, touching the NFC tag write button 626 a second time causes processor 103 to display the pop-up dialog box 634. In another embodiment, touching the NFC tag write button 626 just once immediately leads to the pop-up dialog box 634 being displayed over the second GUI screen 610. In this embodiment, the particular user 15 whose data is to be written to the NFC tag 161 may be selected using a drop down selection listing 636, as shown in FIG. 8. Additionally, or alternatively, these device 180 user data may be typed directly into a text box 638, as shown in FIG. 8.

With the user name and device access level selected for the NFC tag 161 write process, an NFC tag 161 is placed proximal the device 180 at a position sufficient for wireless communication between the tag 161 and the tag reader transceiver 163 of the device 180. Pop-up dialog box 634 includes a write button 640 that, when touched by the user 15, causes processor 103 to begin the NFC tag 161 write process. Alternatively, user 15 touching a cancel button 642 on the pop-up dialog box 634 causes processor 103 to cancel the NFC tag 161 write process, and to close the pop-up dialog box 634, thereby returning to the second GUI screen 610.

Figure 9:
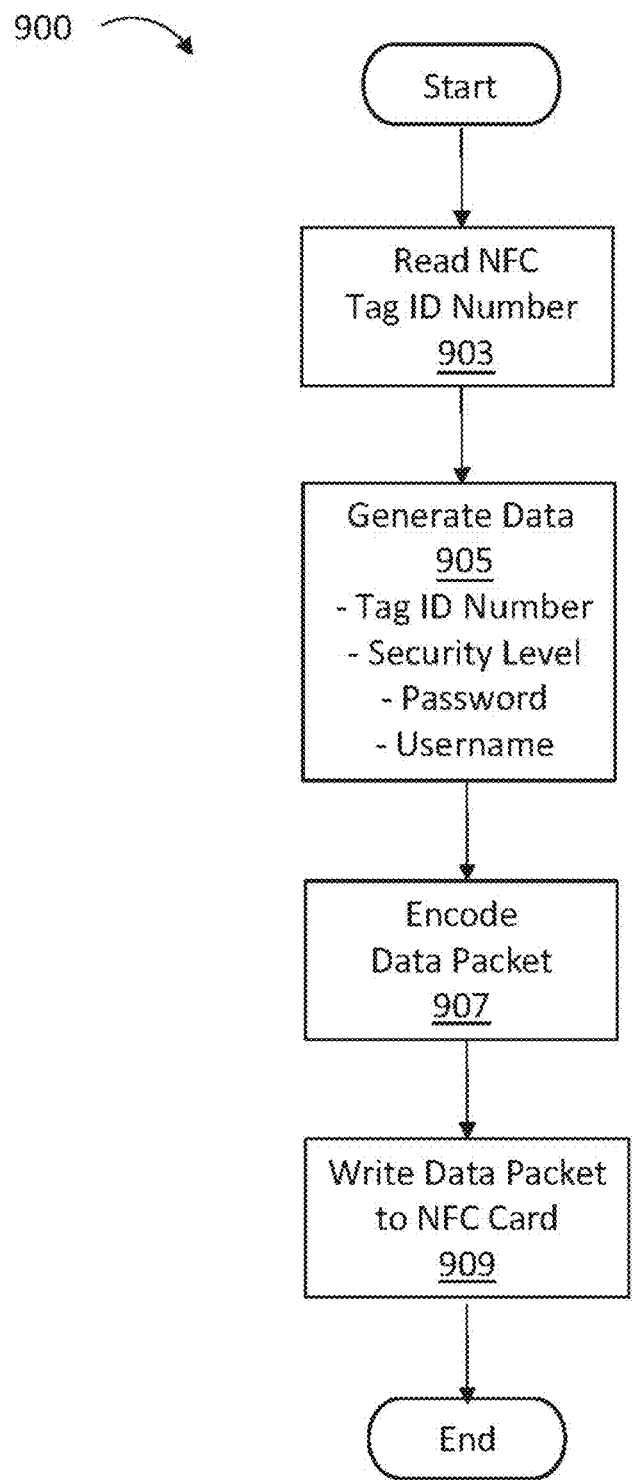
FIG. 9 illustrates a flow chart of a process for writing data to a near-field communication (NFC) tag that may be used with the method of FIG. 2 and the system of FIG. 3, according to an embodiment of the disclosure.

FIG. 9 illustrates a flow chart of a process 900 for writing data to the NFC tag 161 that may be used with the method 200 of FIG. 2 and the system 181 of FIG. 3, according to an embodiment of the disclosure. Process 900 may be utilized, at least in part, for the encoding step 205 of method 200. At or before the start state of process 900, the NFC tag 161 has a uniquely assigned tag ID number encoded thereon, and the NFC tag 161 is positioned proximal the device 180 at a position sufficient for wireless communication between the tag 161 and the tag reader transceiver 123. First, at a process 900 block 903, the processor 103 causes the tag reader transceiver 163 to read the NFC tag ID number from the NFC tag 161. Second, at a process 900 block 905, the processor 103 causes the read tag ID number to be put into a data packet that also contains the username, password and device access level for the respective user 15. Next, at a process 900 block 907, the processor 103 causes this data packet to be encoded 205, and optionally encrypted 207, using arbitrary, but predetermined, mechanism(s) familiar to persons having ordinary skill in the art. Finally, at a process 900 block 909, the processor 103 causes the encoded 205, and optionally encrypted 207, data packet to be written to the NFC tag 161. Process 900 then proceeds to the end state, during which time NFC tag 161 may be transported elsewhere away from device 180 and is ready for further use in method 200 and with system 181 and device 180.

Figure 10:
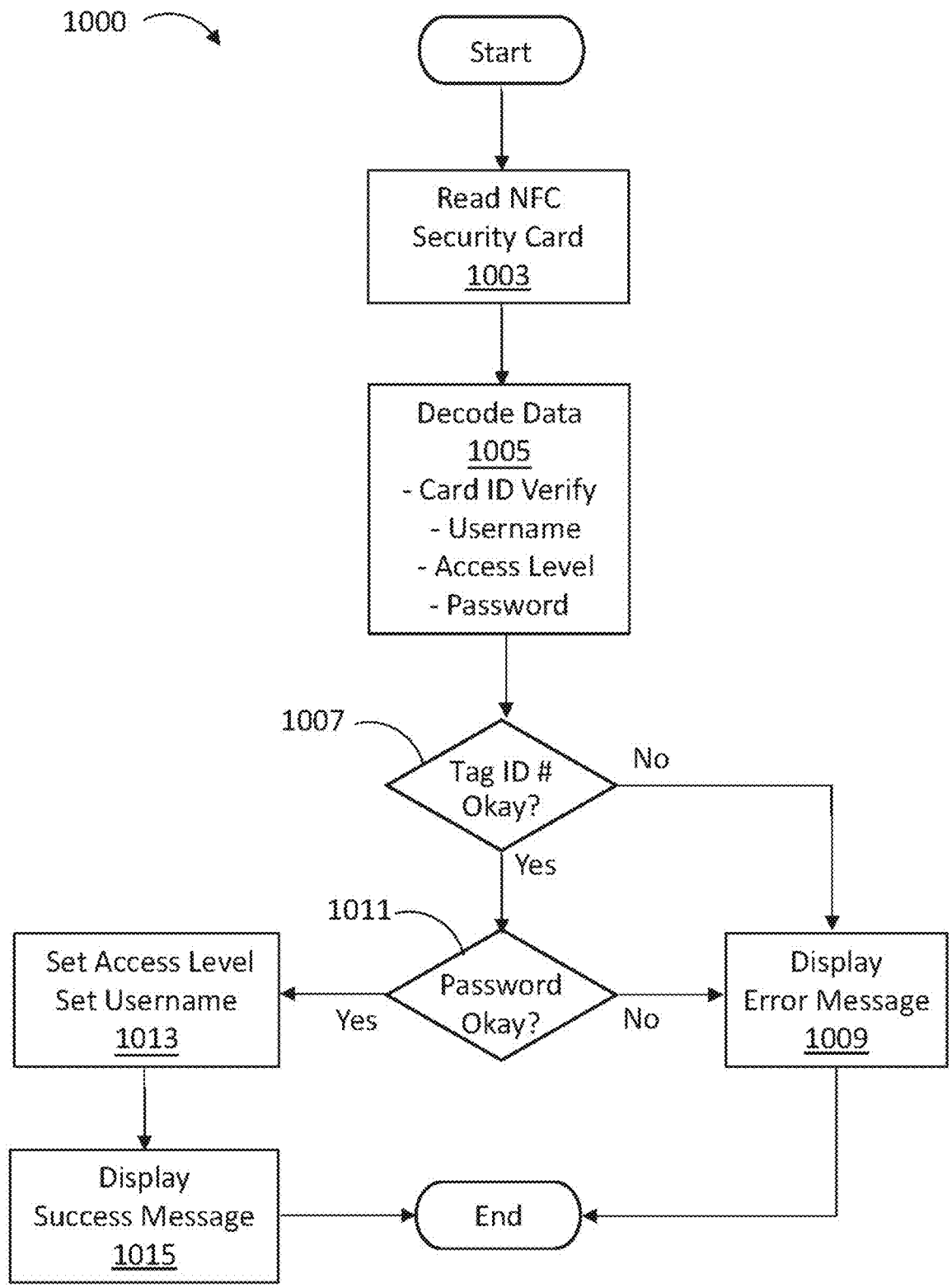
FIG. 10 illustrates a flow chart of a process for reading encoded data from an NFC tag that may be used with the method of FIG. 2 and the system of FIG. 3.

FIG. 10 illustrates a flow chart of a process 1000 for reading encoded data from the NFC tag 161 that may be used with the method 200 of FIG. 2 and the system 181 of FIG. 3. Process 1000 may be utilized, at least in part, for the reading step 209 of method 200. At or before the start state of process 1000, the NFC tag 161 has been subject to the above-described process 900, and the NFC tag 161 is positioned proximal the device 180 at the position sufficient for wireless communication between the tag 161 and the tag reader transceiver 123. First, at a process 1000 block 1003, the processor 103 causes the tag reader transceiver 163 to read the encoded, and optionally encrypted, user data from the NFC tag 161. Second, at a process 1000 block 1005, the processor 103 causes the read tag ID number to be decoded, and optionally decrypted. Next, at a process 1000 block 1007, the processor 103 determines whether or not the tag ID number matches 221 the received 203 configuration data (e.g., as shown in FIG. 4). If there is not a match 221, process 1000 proceeds to a block 1009 where processor 103 causes an error message to be displayed on the display 127. After processor 103 displays the error message in block 1009, device 180 access is denied 215, and process 1000 proceeds to an end state. In the end state, process 1000 waits for another read block 1003 operation to be initiated for another iteration of process 1000.

If, at process 1000 block 1007, processor 103 determines a match 221, process 100 proceeds to a block 1011. In block 1011, processor 103 determines whether or not the device password matches 211 the received 203 configuration data (e.g., as shown in FIG. 4). If there is not a match 211, process 1000 proceeds to block 1009 and continues to the end state, as described above. On the other hand, if, at process 1000 block 1011, processor 103 determines a match 211, process 1000 proceeds to a block 1013 where processor 103 causes the access level and the username to be set for performing device 180 operations. Next, process 1000 proceeds to a block 1015 where processor causes a success message to be provided on the display 127. After processor 103 displays the success message in block 1015, device 180 access is granted 213, and process 1000 proceeds to the end state, as described above.

As used in a system 4 for particle sampling in the facility 3 (as shown in FIG. 1), the particle sampling device 180 in the "headless" configuration includes the features and functionality shown and described above with reference to FIG. 3. In an example, the headless configuration does not include the display 127. System 4 includes the supporting structure (e.g., wall plate 19) for coupling to the facility 3 wall 17. In the example shown in FIG. 1, the headless device 180 is removably positioned on the wall plate 19. Also, as shown in FIG. 4, system 4 includes a tag 161 (e.g., a third tag 161) that is removably attached to and/or positioned in the wall plate 19.

Figure 12A:
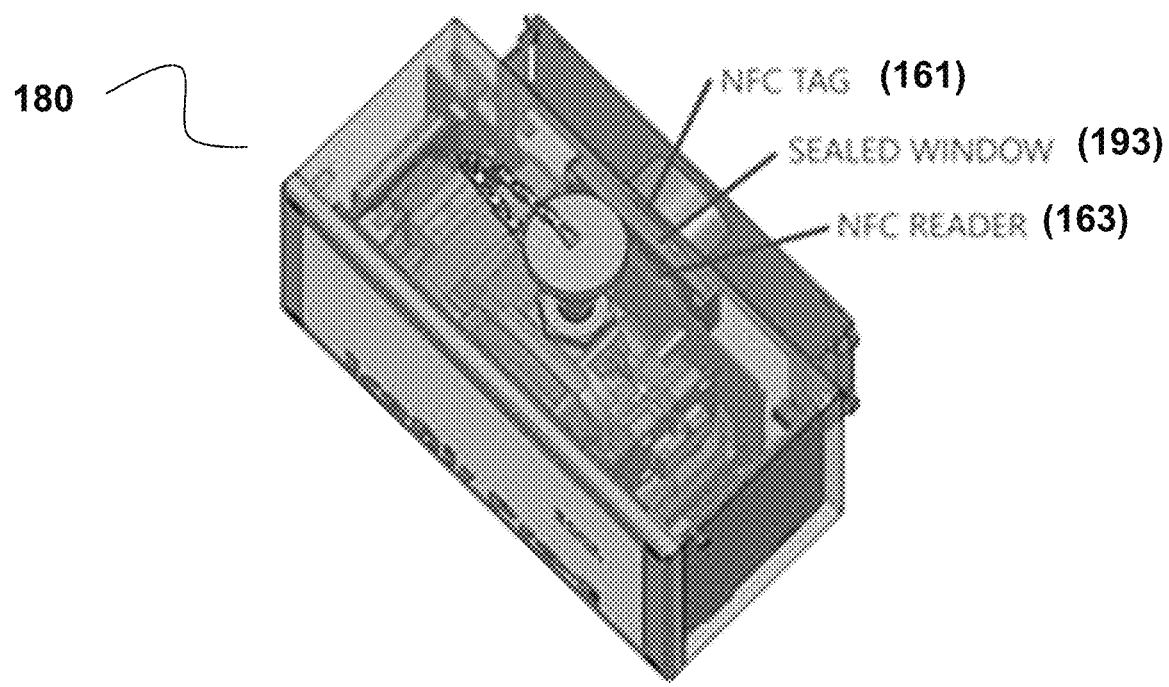
FIGS. 12A and 12B provide schematic diagrams of a particle sampling device and wall plate provided in a "headless configuration."
Figure 12B:
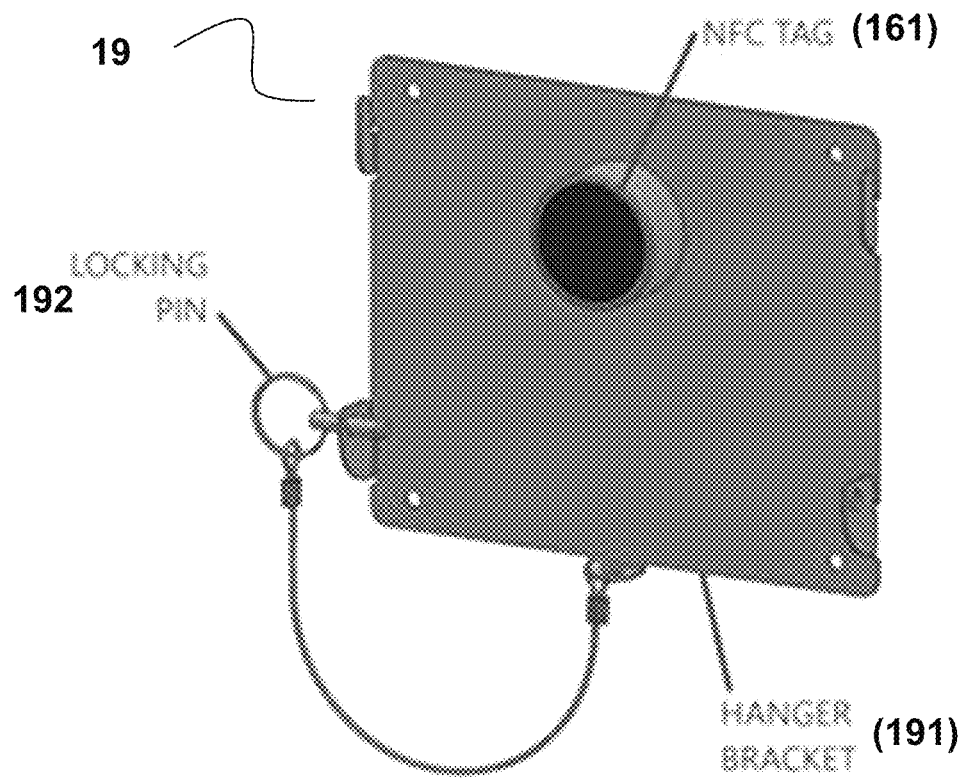

FIGS. 12A and 12B provide schematic diagrams of a particle sampling device and wall plate provided a "headless configuration". Particle sampling device 180 is configured for coupling to wall plate 19 that is fixed to a location in the facility, such as attached to the wall of a room or other location in a facility. As shown in FIG. 12B, wall plate 19 is configured with tag 161, such as a NFC tag, supported by hanger bracket 191. Wall plate 19 further includes locking pin 192 for securing particle sampling device 180 to the hanger bracket 191. As shown in FIG. 12A, particle sampling device 180 includes a tag reader transceiver 163, such as a NFC reader, positioned behind a sealed window 193. The particle sampling device 180 and wall plate 19 are configured to be securely (and optionally detachably) engaged in a manner to permit wireless communication between the tag 161 and a tag reader transceiver 163, upon mounting particle sampling device 180 to wall plate 19. Wireless communication enabled by this configuration may allow for automated device configuration and use, for example, by receipt of device operation configuration data from tag 161 by tag reader transceiver 163. Device configuration data may include security information such as device password, identifying information such as tag ID number, location information such as facility, room and/or area of the device, and/or operation configuration data such as recipe information.

In system 4, the headless device 180 includes a means for receiving electric power from a facility 3 power supply (e.g., a power cable and/or plug for connecting to a utility grid, not shown in FIG. 1). Likewise, the supporting structure (e.g., wall plate 19) includes a means for supplying electric power to the headless device 180 positioned on the supporting structure from the facility power supply (e.g., a power outlet which is directly or indirectly connected to the utility grid, not shown in FIG. 1).

In one embodiment, when the tag 161 is coupled to, and device 180 is positioned on, the supporting structure, respectively, the tag 161 and the device 180 are so positioned in respective positions relative to one another sufficient to permit wireless communication between the tag 161 and the tag reader transceiver 163. Prior to being positioned on or in the wall plate 19, the tag 161 has device configuration parameters encoded as data thereon. The configuration parameters encoded on the tag 161 for use in system 4 include network communication information. The network communication information includes any combination of: transmission control protocol (TCP) information, internet protocol (IP) information, and an IP address, for the device 180 in the headless configuration for system 4.

In an example, the device configuration parameters further include any combination of: a device password, a device ID number or an alphanumeric device identifier, a device recipe, an identifier of the room 9 of the facility 3 where system 4 is located, and an identifier of a sampling location 1 of the facility 3 where system 4 is located. In an example, any of the aforementioned device configuration parameters are encoded, and optionally encrypted, on the tag 161 for use in system 4 in an equivalent, or at least analogous, manner as shown and described above with reference to FIG. 2 for the encoding 205 and/or encrypting 607 steps of method 200.

Figure 11:
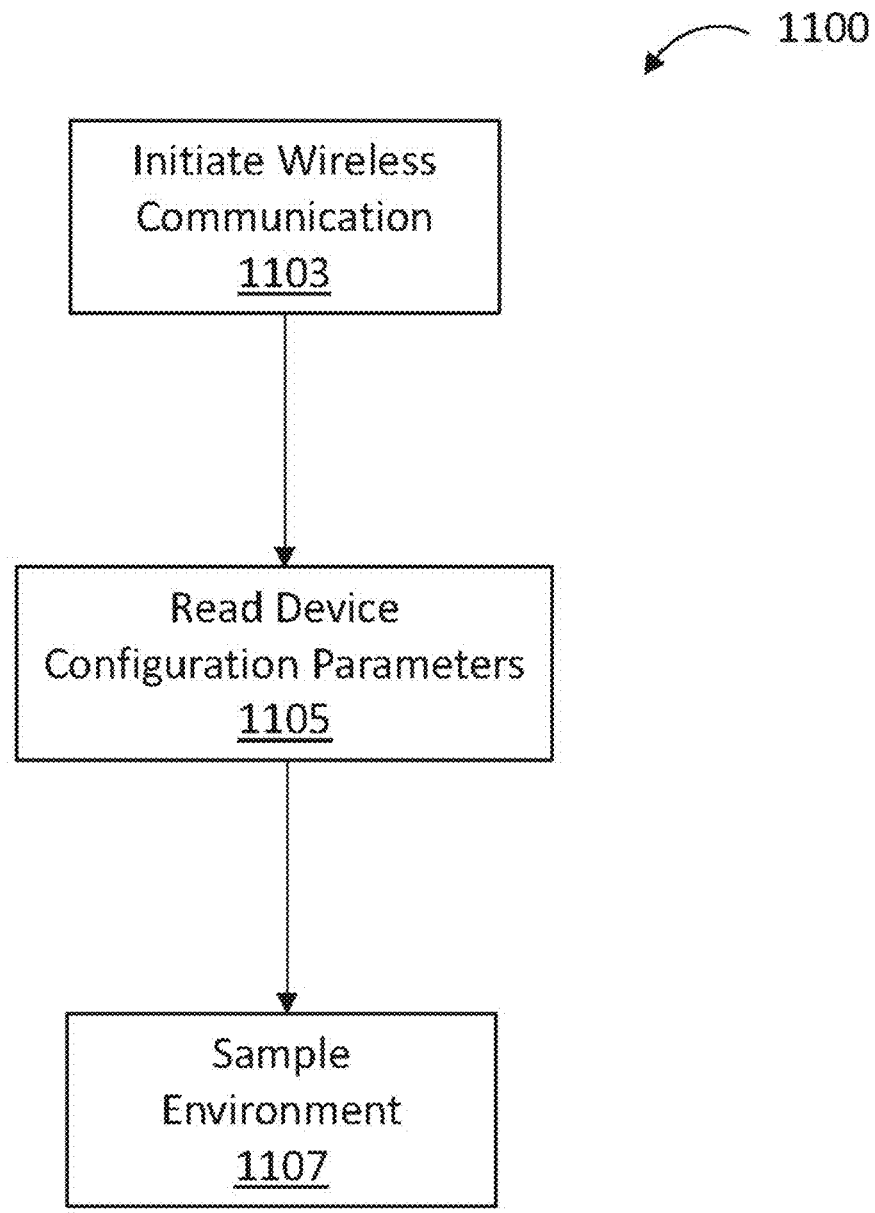
FIG. 11 illustrates a method for operating a particle sampling device in the "headless configuration".

In an embodiment, upon the headless device 180 being positioned on the wall plate 19 supporting structure, and being powered on for use in system 4, the processor 103 performs useful operations for a method 1100 for operating a particle sampling device 180, as shown in FIG. 11. First, at a step 1103, the processor 103 causes the wireless communication between the tag 161 and the tag reader transceiver 163 to be initiated. With the wireless communication being initiated 1103, at a step 1105, the processor 103 causes the tag reader 162 and/or the processor 103 to read the device configuration parameters from the tag 161. In an example, the initiating 1103 and/or reading 1105 steps of method 1100 are performed in an equivalent, or at least analogous, as shown and described above with reference to FIGS. 2 and 4 for the reading 209, transmitting 223, and/or receiving 225 step(s) of method 200.

Having read 1105 the device configuration parameters from the tag 161 after initiating 1103 the wireless communication, processor 103 may cause the wireless communication to be ceased. At this point in method 1100, processor 103 causes 1107 the headless device 180 positioned on wall plate 19 in system 4 to sample the exterior environment 153, which may be performed in method 1100 in an equivalent, or at least analogous manner as shown and described above with reference to the sampling 235 step of method 200. In an example, the causing 1107 step of method 1100 being performed enables the particle sampling of the environment 153 to be performed without any involvement of user(s) 15 whatsoever. When the headless device 180 needs to be removed from the wall plate 19 for service (e.g., maintenance, repair, calibration, etc.), a like instrument having the equivalent, or at least analogous, functionality and components required for use in system 4 may replace it, and the steps of method 1100 may be repeated to bring the replacement headless device 180 on-line quickly and with minimal need to prepare, clean, and otherwise intrude upon the space surrounding system 4. As compared to conventional systems, the use of the tag 161 positioned in the supporting structure of system 4 is advantageous since not wired communication devices or other components are needed other than those components for powering the headless device 180. This further minimizes the need and labor required to perform through cleaning, and thus also minimizes risk of damaging and contamination of the headless device 180 and other equipment and/or products which may be present near system 4.

ADDITIONAL EMBODIMENTS

Additional Embodiments May Include

Embodiment 1

A method of operating a particle sampling system, comprising: receiving device operation configuration data, the configuration data including a device password; reading user data from a tag positioned proximal a particle sampling device of the system, wherein the tag includes the user data encoded thereon, the user data including a device user name and the device password; and in response to the device password read from the tag matching the device password of the received configuration data, granting access to a device user for performing device operations, or in response to the device password read from the tag not matching the device password of the received configuration data, denying the device user access to the device.

Embodiment 2

The method of embodiment 1 or any of the preceding embodiments, wherein: the particle sampling system includes a plurality of particle sampling devices; and receiving the configuration data includes receiving the configuration data by at least two of the plurality of devices.

Embodiment 3

The method of embodiment 2 or any of the preceding embodiments further comprising cloning the configuration data from a first device of the plurality of devices to at least a second device of the plurality of devices.

Embodiment 4

The method of embodiment 1 or any of the preceding embodiments, wherein: the user data encoded on the tag further includes a tag ID number; and receiving the configuration data includes receiving at least one tag number associated with at least one tag authorized for use with the device by the device user.

Embodiment 5

The method of embodiment 4 or any of the preceding embodiments, wherein: reading the user data from the tag includes reading the tag ID number from the tag; and in response to the device password and the tag ID number read from the tag matching the device password and a tag ID number of the received configuration data, granting the access to the device user, or in response to the device password or the tag ID number read from the tag not matching the device password or the tag ID of the received configuration data, denying the device user access to the device.

Embodiment 6

The method of embodiment 1 or any of the preceding embodiments, wherein the tag is an NFC tag for wirelessly communicating with the device using a near field communication protocol.

Embodiment 7

The method of embodiment 6 or any of the preceding embodiments, wherein the NFC tag is a passive NFC tag.

Embodiment 8

The method of embodiment 6 or any of the preceding embodiments, wherein the NFC tag is an active NFC tag.

Embodiment 9

The method of embodiment 6 or any of the preceding embodiments, wherein reading the user data from the tag includes: transmitting an interrogation signal to the NFC tag; and receiving the user data from the NFC tag in response to transmitting the interrogation signal.

Embodiment 10

The method of embodiment 1 or any of the preceding embodiments, wherein: the configuration data further includes a device access level; and the method further comprises, in response to the device password read from the tag matching the device password of the received configuration data, determining the device access level associated with the device user name read from the tag.

Embodiment 11

The method of embodiment 10 or any of the preceding embodiments, wherein reading the user data from the tag includes reading the user data from a first tag positioned proximal the device, and wherein the method further comprises: reading a device recipe from a second tag positioned proximal the device; and loading the device recipe for performing the device operations.

Embodiment 12

The method of embodiment 11 or any of the preceding embodiments further comprising sampling an exterior environment of the device according to the device recipe read from the second tag.

Embodiment 13

The method of embodiment 12 or any of the preceding embodiments further comprising storing data collected for the sampling in association with the device user name read from the first tag.

Embodiment 14

The method of embodiment 11 or any of the preceding embodiments further comprising storing an audit trail for the performed device operations including the device user name read from the first tag associated with one or more of the performed device operations.

Embodiment 15

The method of embodiment 1 or any of the preceding embodiments further comprising encoding the user data on the tag.

Embodiment 16

The method of embodiment 15 or any of the preceding embodiments, wherein encoding the user data on the tag includes encrypting at least some of the user data on the tag.

Embodiment 17

The method of embodiment 16 or any of the preceding embodiments, wherein reading the user data from the tag includes decrypting the at least some of the user data encoded on the tag.

Embodiment 18

The method of embodiment 11 or any of the preceding embodiments further comprising encoding data for the device recipe on the second tag.

Embodiment 19

The method of embodiment 18 or any of the preceding embodiments, wherein encoding data for the device recipe on the second tag includes encrypting at least some of the data for the device recipe on the second tag.

Embodiment 20

The method of embodiment 19 or any of the preceding embodiments, wherein reading the device recipe from the second tag includes decrypting the at least some of the data for the device recipe encoded on the second tag.

Embodiment 21

The method of embodiment 15 or any of the preceding embodiments, wherein: the first tag includes a plurality of first tags; and encoding the user data on the first tag includes encoding the same device password on each first tag of the plurality of first tags.

Embodiment 22

The method of embodiment 21 or any of the preceding embodiments, wherein: the user data further includes a tag ID number.

Embodiment 23

The method of embodiment 21 or any of the preceding embodiments, wherein: the user data includes a plurality of device user names for a plurality of device users; and encoding the user data on the tag includes encoding a unique device user name to the each first tag.

Embodiment 24A

The method of embodiment 23 or any of the preceding embodiments, wherein: the user data includes a plurality of device access levels; each of the plurality of device access levels is associated with a respective one or more of the plurality of device user names; and encoding the user data on the first tag further includes: encoding one device access level for one of the plurality of device user names on the each first tag, or encoding two or more device access levels for the one device user name on the each first tag.

Embodiment 24B

The method of embodiment 24A or any of the preceding embodiments, further comprising providing a first audio sound during reading, encoding and/or writing the tag to indicate to the user that the reading, encoding and/or writing process is active.

Embodiment 24C

The method of embodiment 24B or any of the preceding embodiments, further comprising providing a second sound for indicating that the reading, encoding and/or writing process for the tag is complete (e.g., The sound may be a warbling, or a clicking noise followed by a distinctive beep to indicate the process is complete.)

Embodiment 24D

The method of embodiment 24C or any of the preceding embodiments, further comprising providing an on-screen indication for indicating that the reading, encoding and/or writing process is complete.

Embodiment 25

A particle sampling device, comprising: a device housing including a sampling port; a sampler for sampling particles of an exterior environment of the device, wherein the sampler is positioned in the housing and in flow communication with the sampling port; a tag reader positioned on or in the housing, and including a tag reader transceiver; and a processor in communication with the tag reader, wherein the processor is configured to: receive device operation configuration data, the configuration data including a device password; read, using the tag reader, user data from a tag positioned proximal the device, wherein the tag includes the user data encoded thereon, the user data including a device user name and the device password; and in response to the device password read from the tag matching the device password of the received configuration data, grant access to the device to a device user for performing device operations, or in response to the device password read from the tag not matching the device password of the received configuration data, deny the device user access to the device.

Embodiment 26

The device of embodiment 25 or any of the preceding embodiments further comprising a data transfer interface in communication with the processor, wherein, to receive the device configuration data, the processor is further configured to receive the configuration data via the data transfer interface.

Embodiment 27

The device of embodiment 25 or any of the preceding embodiments further comprising a memory device in communication with the processor, wherein the processor is further configured to store the received configuration data in the memory device.

Embodiment 28

The device of embodiment 25 or any of the preceding embodiments, wherein: the device is one of a plurality of particle sampling devices; and to receive the configuration data, the processor is further configured to receive the configuration data for at least two of the plurality of devices.

Embodiment 29

The device of embodiment 28 or any of the preceding embodiments further comprising a memory device in communication with the processor, wherein the processor is further configured to store the received configuration data for the at least two devices in the memory device.

Embodiment 30

The device of embodiment 25 or any of the preceding embodiments further comprising a display in communication with the processor, wherein: the processor is further configured to display a graphical user interface (GUI) on the display; and to receive the configuration data, the processor is further configured to receive at least some of the configuration data via the GUI.

Embodiment 31

The device of embodiment 25 or any of the preceding embodiments, wherein: at least some of the user data encoded on the tag is encrypted; and to read the user data from the tag, the processor is further configured to decrypt the at least some of the user data encoded on the tag.

Embodiment 32

The device of embodiment 25 or any of the preceding embodiments, wherein the tag is an NFC tag for wirelessly communicating with the tag reader of the device.

Embodiment 33

The device of embodiment 32 or any of the preceding embodiments, wherein, to read the user data from the tag, the processor is further configured to: transmit, using the tag reader, an interrogation signal to the NFC tag; and receive, using the tag reader, the user data from the NFC tag in response to transmitting the interrogation signal.

Embodiment 34

The device of embodiment 25 or any of the preceding embodiments, wherein: the configuration data further includes a device access level; and in response to the device password read from the tag matching the device password of the received configuration data, the processor is further configured to determine the device access level associated with the device user name read from the tag.

Embodiment 35

The device of embodiment 34 or any of the preceding embodiments, wherein to read the user data from the tag, the processor is configured to read the user data from a first tag positioned proximal the device, and wherein the processor is further configured to: read a device recipe from a second tag positioned proximal the device; and load the device recipe for performing the device operations.

Embodiment 36

The device of embodiment 34 or any of the preceding embodiments, wherein the device recipe includes one or more of a sampling time, volume of air to be sampled, a flow rate, a number of samples to be taken, alarm limits, sampling location and any combination of these.

Embodiment 37

The device of embodiment 36 or any of the preceding embodiments, wherein the device recipe includes: multi-tiered location information including: an area, a room, and at least one location within the room; and one or more of: a sampling type, and a room certification type.

Embodiment 38

The device of embodiment 25 or any of the preceding embodiments, wherein the sampler is or includes an optical particle counter.

Embodiment 39

The device of embodiment 25 or any of the preceding embodiments, wherein the sampler is or includes an impactor.

Embodiment 40

The device of embodiment 25 or any of the preceding embodiments, wherein the sampler is or includes an impinger.

Embodiment 41

The device of embodiment 22 or any of the preceding embodiments, wherein the device is a portable particle sampling device including a power supply positioned in or on the device housing.

Embodiment 42

A system for operating a particle sampling device, the system comprising: a tag, and the particle sampling device, wherein the particle sampling device comprises: a device housing including a sampling port; a sampler for sampling particles of an exterior environment of the device, wherein the sampler is positioned in the housing and in flow communication with the sampling port; a tag reader positioned on or in the housing, and including a tag reader transceiver; and a processor in communication with the tag reader, wherein the processor is configured to: receive device operation configuration data, the configuration data including a device password; read, using the tag reader, user data from a tag positioned proximal the device, wherein the tag includes the user data encoded thereon, the user data including a device user name and the device password; and in response to the device password read from the tag matching the device password of the received configuration data, grant access to the device to a device user for performing device operations, or in response to the device password read from the tag not matching the device password of the received configuration data, deny the device user access to the device.

Embodiment 43

The system of embodiment 42 or any of the preceding embodiments further comprising a supporting structure positioned in a facility, wherein the tag and the device are detachably mounted to the supporting structure.

Embodiment 44

The system of embodiment 43 or any of the preceding embodiments, wherein the supporting structure is or includes a wall plate coupled to a wall of the facility.

Embodiment 45

The system of embodiment 44 or any of the preceding embodiments, wherein the tag is positioned in or on the wall plate.

Embodiment 46

The system of embodiment 42 or any of the preceding embodiments, wherein the device further comprises a means for receiving electric power from a facility power supply.

Embodiment 47A

The system of embodiment 43 or any of the preceding embodiments, wherein the supporting structure includes a means for supplying electric power to the device.

Embodiment 47B

The device of any of embodiment 47A or any of the preceding embodiments, wherein the device is configured to provide a first audio sound during reading, encoding and/or writing the tag to indicate to the user that the reading, encoding and/or writing process is active.

Embodiment 47C

The device of any of embodiment 47B or any of the preceding embodiments, wherein the device is configured to provide a second sound for indicating that the reading, encoding and/or writing process for the tag is complete.

Embodiment 47D

The device of embodiment 47C or any of the preceding embodiment, wherein the device is configured to provide an on-screen indication for indicating that the reading, encoding and/or writing process is complete.

Embodiment 48

A system for particle sampling in a facility, comprising: A) a particle sampling device comprising: (i) a device housing including a sampling port; (ii) a sampler for sampling particles of an exterior environment of the device, wherein the sampler is positioned in the housing and in flow communication with the sampling port; (iii) a tag reader positioned on or in the housing, and including a tag reader transceiver; and (iv) a processor in communication with the tag reader; B) a supporting structure for coupling to a wall of the facility to facilitate removably positioning the device thereon; and C) a tag for coupling to the supporting structure, wherein: (1) when the tag is coupled to, and device is positioned on, the supporting structure, respectively, the tag and the device are so positioned in respective positions sufficient to permit wireless communication between the tag and the tag reader transceiver; (2) the tag includes device configuration parameters encoded as data thereon; and (3) in response to the device being powered on, the processor is configured to: (a) initiate the wireless communication between the tag and the tag reader transceiver; (b) read, using the tag reader, the device configuration parameters from the tag; and (c) cause the device to perform particle sampling of the exterior environment without involvement of a device user.

Embodiment 49

The system of Embodiment 48, wherein the supporting structure is or includes a wall plate coupled to the wall of the facility.

Embodiment 50

The system of any of Embodiments 48-49, wherein the configuration parameters include network communication information

Embodiment 51

The system of any of Embodiments 48-50, wherein the network communication information includes at least one of: Transmission Control Protocol (TCP) information, Internet Protocol (IP) information.

Embodiment 52

The system of any of Embodiments 48-51, wherein the configuration parameters further comprise user specific configuration data.

Embodiment 53

The system of any of Embodiments 48-52, wherein the configuration parameters include one or more of a sampling time, a device recipe, a location name for instrument, a sample queue size, one or more Wi-Fi communication parameters, a flow cap-off retry count and time, a digital output signal configuration or any combination of these.

Embodiment 54

The system of any of Embodiments 48-53, wherein the configuration parameters include one or more input parameters.

Embodiment 55

The system of any of Embodiments 48-54, wherein said one or more input parameters include one or more channel name, a scale, an offset or any combination of these.

Embodiment 56

The system of any of Embodiments 48-55, wherein the configuration parameters include one or more output parameters.

Embodiment 57

The system of Embodiments 48-56, wherein said one or more output parameters include one or more scaling factor.

Embodiment 58

The system of any of Embodiments 48-57, wherein the configuration parameters include one or more sampling parameters for stand-alone use.

Embodiment 59

The system of Embodiments 48-58, wherein said one or more sampling parameters for stand-alone use include one or more of a sample delay, a sample tare time, a sample interval, a sample repeat count, "Auto-Start" mode or any combination of these.

Embodiment 60

The system of any of Embodiments 48-59, the configuration parameters include one or more parameters for generating or processing an output signal of the device.

Embodiment 61

The system of any of Embodiments 48-60, wherein the parameter for generating or processing the output signal is a parameter for generating or processing an analog output signal.

Embodiment 62

The system of any of Embodiments 48-61, wherein the parameter for generating or processing the analog output signal is a scaling parameter, offset parameter, threshold parameter, filtering parameter or any combination of these.

Embodiment 63

The system of any of Embodiments 48-62, wherein the configuration parameters include an action limit, an alert limit or any combination of theses.

Embodiment 64

The system of any of Embodiments 48-63, wherein the device configuration parameters further include a device password, a device ID number, an alphanumeric device identifier, an identifier of a room of the facility, an identifier of a sampling location of the facility or any combination of these.

Embodiment 65

The system of any of Embodiments 48-64, wherein the device does not include a display.

Embodiment 66

The system of any of Embodiments 48-65, wherein said tag is capable of being copied by a user so as to allow the device configuration parameters to be encoded as data on a plurality of tags and/or used as the basis for a new set of custom tags.

Embodiment 67

The system of any of Embodiments 48-65, wherein said system includes a plurality of particle sampling devices provided in one or more user environments, wherein said plurality of tags are configured for use with said plurality of particle sampling devices.

Embodiment 68

A non-transitory computer-readable medium having stored thereon program instructions for operating a particle sampling device, which, when executed by one or more processors in communication with a tag reader of the device, cause the one or more processors to: receive device operation configuration data, the configuration data including a device password; read, using the tag reader, user data from a tag positioned proximal the device, wherein the tag includes the user data encoded thereon, the user data including a device user name and the device password; and in response to the device password read from the tag matching the device password of the received configuration data, grant access to the device to a device user for performing device operations, or in response to the device password read from the tag not matching the device password of the received configuration data, deny the device user access to the device.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

As used herein, "comprising" is synonymous with "including," "containing," "having," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

One of ordinary skill in the art will appreciate that analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of operating a particle sampling system, comprising:
    receiving device operation configuration data, the configuration data including a device password and a device access level;
    reading user data from a first tag positioned proximal a particle sampling device, wherein the tag includes the user data encoded thereon, the user data including a device user name and a device password; and
    in response to the device password read from the tag matching the device password of the received configuration data, determining the device access level associated with the device user name read from the tag and granting access to a device user for performing device operations, or
    in response to the device password read from the tag not matching the device password of the received configuration data, denying the device user access to the device;
    reading a device recipe from a second tag positioned proximal the device; and
    loading the device recipe for performing the device operations; and
    i. sampling an exterior environment of the device according to the device recipe read from the second tag;
    ii. storing data collected for the sampling in association with the device user name read from the first tag;
    iii. storing an audit trail for the performed device operations including the device user name read from the first tag associated with one or more of the performed device operations; or
    iv. any combination of these.

2. The method of claim 1, wherein:
    the particle sampling system includes a plurality of particle sampling devices; and
    receiving the configuration data includes receiving the configuration data by at least two of the plurality of devices.

3. The method of claim 2 further comprising cloning the configuration data from a first device of the plurality of devices to at least a second device of the plurality of devices.

4. The method of claim 1, wherein:
    the user data encoded on the first tag further includes a tag ID number; and
    receiving the configuration data includes receiving at least one tag number associated with at least one tag authorized for use with the device by the device user.

5. The method of claim 4, wherein:
    reading the user data from the first tag includes reading the tag ID number from the tag; and
    in response to the device password and the tag ID number read from the first tag matching the device password and a tag ID number of the received configuration data, granting the access to the device user, or
    in response to the device password or the tag ID number read from the first tag not matching the device password or the tag ID of the received configuration data, denying the device user access to the device.

6. The method of claim 1 further comprising encoding the user data on the first tag; wherein encoding the user data on the first tag includes encrypting at least some of the user data on the first tag and wherein reading the user data from the tag includes decrypting the at least some of the user data encoded on the first tag.

7. The method of claim 6, wherein:
the first tag includes a plurality of first tags; and
encoding the user data on the first tag includes encoding the same device password on each first tag of the plurality of first tags; wherein the user data further includes a tag ID number.

8. The method of claim 7, wherein:
the user data includes a plurality of device user names for a plurality of device users; and
encoding the user data on the first tag includes encoding a unique device user name to the each first tag; wherein:
the user data includes a plurality of device access levels;
each of the plurality of device access levels is associated with a respective one or more of the plurality of device user names; and
encoding the user data on the first tag further includes:
encoding one device access level for one of the plurality of device user names on the each first tag, or
encoding two or more device access levels for the one device user name on the each first tag.

9. A method of operating a particle sampling system, comprising:
receiving device operation configuration data the configuration data including a device password and a device access level;
reading user data from a first tag positioned proximal a particle sampling device, wherein the tag includes the user data encoded thereon, the user data including a device user name and a device password; and
in response to the device password read from the tag matching the device password of the received configuration data, determining the device access level associated with the device user name read from the tag and granting access to a device user for performing device operations, or
in response to the device password read from the tag not matching the device password of the received configuration data denying the device user access to the device;
encoding data for the device recipe on a second tag; wherein encoding data for the device recipe on the second tag includes encrypting at least some of the data for the device recipe on the second tag;
reading a device recipe from the second tag positioned proximal the device; wherein reading the device recipe from the second tag includes decrypting the at least some of the data for the device recipe encoded on the second tag; and
loading the device recipe for performing the device operations.

* * * * *